(12) United States Patent
Lou et al.

(10) Patent No.: US 11,997,499 B2
(45) Date of Patent: May 28, 2024

(54) COMMUNICATION METHOD AND COMMUNICATIONS APPARATUS

(71) Applicant: HUAWEI TECHNOLOGIES CO., LTD., Guangdong (CN)

(72) Inventors: Chong Lou, Shanghai (CN); Rui Wang, Shanghai (CN); Mingzeng Dai, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 23 days.

(21) Appl. No.: 17/358,580

(22) Filed: Jun. 25, 2021

(65) Prior Publication Data

US 2021/0321264 A1 Oct. 14, 2021

Related U.S. Application Data

(63) Continuation of application No. 16/522,052, filed on Jul. 25, 2019, now Pat. No. 11,051,173, which is a
(Continued)

(30) Foreign Application Priority Data

Jan. 25, 2017 (CN) .......................... 201710062740.1

(51) Int. Cl.
*H04W 16/10* (2009.01)
*H04W 48/12* (2009.01)
*H04W 84/04* (2009.01)

(52) U.S. Cl.
CPC .......... *H04W 16/10* (2013.01); *H04W 48/12* (2013.01); *H04W 84/042* (2013.01)

(58) Field of Classification Search
CPC ... H04W 16/10; H04W 48/12; H04W 84/042; H04W 48/08; H04W 48/18; H04W 36/08;
(Continued)

(56) References Cited

U.S. PATENT DOCUMENTS

| 9,515,873 B2 | 12/2016 | Anumala |
| 2014/0269295 A1 | 9/2014 | Anumala |

(Continued)

FOREIGN PATENT DOCUMENTS

| CN | 105516312 | 4/2016 |
| CN | 106060900 | 10/2016 |

(Continued)

OTHER PUBLICATIONS

3GPP TS 23.401 V14.2.0 (Dec. 2016), "3rd Generation Partnership Project; Technical Specification Group Services and System Aspects; General Packet Radio Service (GPRS) enhancements for Evolved Universal Terrestrial Radio Access Network (E-UTRAN) access(Release 14)," Dec. 2016, 385 pages.

(Continued)

*Primary Examiner* — Ajit Patel
*Assistant Examiner* — Wilfred Thomas
(74) *Attorney, Agent, or Firm* — Fish & Richardson P.C.

(57) ABSTRACT

Embodiments of communications apparatuses, systems, and methods are provided in this disclosure. In an embodiment, an apparatus comprises: at least one processor, and a memory storing instructions for execution by the at least one processor to perform operations comprising: sending, to a network node, a first message comprising a first network slice identifier corresponding to a network slice in a first network slice set, wherein the network slice is accessed by a terminal device to a first access-network node, wherein the network node is a first core-network node or a second access-network node to be accessed by the terminal device, and wherein the first core-network node and the first access-network node are comprised in a first communications system; and receiving, from the network node, a first response message comprising a second network slice iden-
(Continued)

tifier corresponding to a network slice in a second network slice set.

20 Claims, 6 Drawing Sheets

Related U.S. Application Data continuation of application No. PCT/CN2018/074128, filed on Jan. 25, 2018.

(58) Field of Classification Search
CPC ......... H04W 36/0072; H04W 36/0077; H04W 36/00
See application file for complete search history.

(56) References Cited

U.S. PATENT DOCUMENTS

| | | | |
|---|---|---|---|
| 2016/0353367 A1 | 12/2016 | Vrzic et al. | |
| 2017/0070892 A1* | 3/2017 | Song | H04W 48/20 |
| 2018/0124854 A1 | 5/2018 | Myhre et al. | |
| 2018/0324761 A1 | 11/2018 | Velev et al. | |
| 2018/0352501 A1 | 12/2018 | Zhang et al. | |
| 2019/0014515 A1 | 1/2019 | Zee et al. | |
| 2019/0021047 A1* | 1/2019 | Zong | H04W 76/11 |
| 2019/0045351 A1* | 2/2019 | Zee | H04W 76/11 |
| 2019/0098545 A1 | 3/2019 | Zhang et al. | |
| 2019/0159119 A1* | 5/2019 | Djordjevic | H04W 8/18 |
| 2019/0174368 A1 | 6/2019 | Decarreau et al. | |
| 2019/0174498 A1 | 6/2019 | Samdanis et al. | |
| 2019/0182737 A1* | 6/2019 | Futaki | H04W 24/10 |
| 2019/0320314 A1 | 10/2019 | Yang | |
| 2019/0357130 A1* | 11/2019 | Garcia Azorero | H04W 8/08 |
| 2020/0305054 A1* | 9/2020 | Zee | H04W 36/0061 |
| 2021/0153110 A1* | 5/2021 | Garcia Martin | H04W 48/18 |
| 2021/0410026 A1* | 12/2021 | Liu | H04W 76/30 |

FOREIGN PATENT DOCUMENTS

| | | |
|---|---|---|
| CN | 106131891 | 11/2016 |
| CN | 106210042 | 12/2016 |
| CN | 106341832 | 1/2017 |
| EP | 3437367 A1 | 2/2019 |
| EP | 3442293 A1 | 2/2019 |
| EP | 3493649 A1 | 6/2019 |
| RU | 2547144 C1 | 4/2015 |
| WO | 2017005208 | 1/2017 |
| WO | 2017135860 A1 | 8/2017 |
| WO | 2017171598 | 10/2017 |

OTHER PUBLICATIONS

Apple, "A solution of network slice instance selection and association", 3GPP Draft vol. SA WG2 Meeting #116Bis, S2-165458, Sanya, P.R China, Aug. 29-Sep. 2, 2016, 6 pages.

Ericsson, "Network Slice Selection for 5G", 3GPP Draft RAN WG3, R3-161889, Gothenburg, Sweden, Aug. 22-26, 2016, 8 pages.

Ericsson, "TP regarding impacts of NW slice awareness to RAN signalling," 3GPP TSG-RAN WG3 NR Ad Hoc, R3-170290, Spokane, WA, U.S., Jan. 16-20, 2017, 4 pages.

Extended European Search Report issued in European Application No. 18744018.5 dated Sep. 20, 2019, 15 pages.

NEC, "pCR: CB: # 23_SimplifyTP", 3GPP Draft RAN WG3 Meeting #Ad-Hoc, R3-170333, Spokane, Washington, USA, Jan. 17-19, 2017, 4 pages.

Office Action issued in Chinese Application No. 201710062740.1 dated May 7, 2020, 10 pages.

Office Action issued in Chinese Application No. 201811612375.8 dated Jun. 20, 2019, 9 pages (With English Translation).

Office Action issued in Indian Application No. 201937031491 dated Mar. 15, 2021, 5 pages.

Office Action issued in Japanese Application No. 2019-560451 dated Nov. 4, 2020, 9 pages (with English translation).

PCT International Search Report and Written Opinion issued in International Application No. PCT/CN2018/074,128, dated Mar. 27, 2018, 12 pages (With Partial English Translation).

Qualcomm Incorporated, "Network Slice Selection," 3GPP TSG-RAN WG3 Meeting #93, R3-161665, Gothenburg, Sweden, Aug. 22-26, 2016, 4 pages.

Qualcomm Incorporated, "Slice Rejection Handling in Xn Handover", 3GPP Draft RAN WG3 Meeting #98, R3-174443, Reno, Nevada, USA, Nov. 27-Dec. 1, 2017, 4 pages.

ZTE, "Selection RAN Part Network Slice during UE mobility," 3GPP TSG RAN WG3 NR-adhoc, R3-170065, Spokane, USA, Jan. 17-19, 2017, 7 pages.

Office Action issued in Russian Application No. 2019126451/07(051859) dated Jun. 2, 2021, 13 pages (with English translation).

3GPP TR 38.801 v.0.7.0 (Nov. 2016), "3rd Generation Partnership Project; Technical Specification Group Radio Access Network; Study on New Radio Access Technology; Radio Access Architecture and Interfaces," Nov. 2016, 72 pages.

Extended European Search Report issued in European Application No. 21159337.1 dated Oct. 4, 2021, 22 pages.

LG Electronics Inc., "Consideration on network Slice in Nr," 3GPP TSG-RAN WG3 Meeting #93bis, R3-162474, Sophia Antipolis, France, Oct. 10-14, 2016, 5 pages.

EP Communication Pursuant to Article 94(3) EPC in European Appln No. 21159337.1, dated May 4, 2023, 11 pages.

* cited by examiner

COMMUNICATION METHOD AND COMMUNICATIONS APPARATUS

CROSS-REFERENCE TO RELATED APPLICATIONS

This application is a continuation of U.S. patent application Ser. No. 16/522,052, filed on Jul. 25, 2019, which is a continuation of International Application No. PCT/CN2018/074128, filed on Jan. 25, 2018, which claims priority to Chinese Patent Application No. 201710062740.1, filed on Jan. 25, 2017. All of the afore-mentioned patent applications are hereby incorporated by reference in their entireties.

TECHNICAL FIELD

This application relates to the communications field, and more specifically, to a communication method and a communications apparatus.

BACKGROUND

In a fifth-generation (fifth-generation, 5G) communications system, a network architecture of network slicing NS (Network slice, NS) is proposed, to satisfy different user requirements.

However, in an actual network scenario, some network slices may be deployed only in a local network area. For example, a network slice is established in an industrial park or a stadium, to improve user experience when a terminal device initiates a service in the industrial park or the stadium. If the terminal device needs to be handed over from a source cell to a target cell, it is likely that the target cell does not support a network slice that the terminal device needs to access. Therefore, a technology is required for selecting an appropriate network slice for the terminal device.

SUMMARY

This application provides a communication method and a communications apparatus, so as to select a network slice for a terminal device with reference to a status of a network slice supported by an access-network device to be accessed by the terminal device.

According to a first aspect, a communication method is provided. The communication method includes: sending, by a first network node, a first message to a second network node, where the first message includes a network slice identifier corresponding to at least one network slice in a first network slice set, the network slice in the first network slice set is a network slice that is selected for a terminal device and that is used for access by the terminal device, the first network node is a first access-network node that is currently accessed by the terminal device, the second network node is a first core-network node or a second access-network node to be accessed by the terminal device, and the first core-network node is a core-network node of a communications system to which the first network node belongs; and receiving, by the first network node, a first response message sent by the second network node, where the first response message includes a network slice identifier corresponding to at least one network slice in a second network slice set; the second network slice set is a set of network slices that are used for access by the terminal device and that are determined by the second network node based on a status of a network slice supported by the second access-network node and the network slice identifier corresponding to the at least one network slice in the first network slice set, or the second network slice set is a set of network slices that are used for access by the terminal device and that are determined by a second core-network node based on a status of a network slice supported by the second access-network node and the network slice identifier corresponding to the at least one network slice in the first network slice set; and the second core-network node is a core-network node of a communications system to which the second access-network node belongs.

Therefore, according to the communication method in this embodiment of this application, the first network node sends the first message to the second network node, where the first message includes the network slice identifier corresponding to the at least one network slice in the first network slice set. Based on the network slice identifier corresponding to the at least one network slice in the first network slice set included in the first message, the second network node may determine, with reference to the status of the network slice supported by the second access-network node, the network slice identifier corresponding to the at least one network slice in the second network slice set. Because the network slice identifier corresponding to the at least one network slice in the second network slice set is determined based on a status of a network slice supported by the second access-network node to be accessed by the terminal device, when the terminal device is handed over from the first access-network node to the second access-network node, the status of the network slice supported by the second access-network node can be considered, to determine a to-be-accessed network slice for the terminal device, thereby ensuring smooth handover.

Optionally, the first message may be a handover request message, or if the second network node is the second access-network node, the first message may alternatively be another message used for communication between the first access-network node and the second access-network node, or if the second network node is the first core-network node, the first message may alternatively be another message used for communication between the first access-network node and the first core-network node.

Correspondingly, the first response message may be a handover request acknowledgment message, or if the second network node is the second access-network node, the first response message may alternatively be another message used for communication between the first access-network node and the second access-network node, or if the second network node is the first core-network node, the first response message may alternatively be another message used for communication between the first access-network node and the first core-network node.

In a possible implementation, the second network slice set is determined by the first core-network node or the second core-network node, the first response message further includes a first non-access stratum NAS message, the first NAS message includes the network slice identifier corresponding to the at least one network slice in the second network slice set, and the first NAS message is used to instruct the terminal device to initiate a network slice reselection process.

Specifically, the second network slice set may be determined by the core-network node in the communications system to which the first network node belongs, namely, the first core-network node. In this case, the first access-network node and the second access-network node belong to a same communications system. Alternatively, the second network slice set may be determined by the core-network node in the communications system to which the second access-network node belongs, namely, the second core-network node. When the first response message is determined by a core-network node (the first core-network node or the second core-network node), the first response message may further include the first NAS message, where the first NAS message includes the network slice identifier corresponding to the at least one network slice in the second network slice set determined by the core-network node. After receiving the first response message including the first NAS message, the first network node may transmit the first NAS message to the terminal device, so that the terminal device may initiate the network slice reselection process after receiving the first NAS message.

In a possible implementation, the method further includes, sending, by the first network node, a second message to the terminal device, where the second message includes the first NAS message.

Optionally, the second message may be a handover instruction, and the handover instruction may be used for handing over the terminal device from the first access-network node to the second access-network node.

In a possible implementation, the method further includes: receiving, by the first network node, a third message sent by the terminal device or the first core-network node, where the third message includes a network slice identifier corresponding to each network slice in the first network slice set.

Specifically, the first network node may obtain, from the terminal device, information about a network slice that is selected for the terminal device and that is used for access by the terminal device (or that the terminal device wants to access or is capable of accessing), or may obtain, from the core-network node, the information about the network slice that the terminal device wants to access (or that the terminal device wants to access or is capable of accessing).

Optionally, if the third message is sent by the terminal device, the third message may be a radio resource control connection request (RRC Connection Request), an RRC connection reestablishment request (RRC Connection Reestablishment Request), or an RRC connection setup complete (RRC Connection Setup Complete) message.

Alternatively, if the third message is sent by the first core-network node, the third message may be a message that requests to establish an interface between the first access-network node and the first core-network node, an initial terminal device context setup message, or another message used for communication between an access-network node and a core-network node. The first core-network node may proactively send the third message to the first access-network node, or may send the third message to the first access-network node based on a request message of the first access-network node.

In a possible implementation, the first message further includes at least one of the following: a network slice priority; a network slice identifier, a cell identity, a tracking area identifier or code, a paging area identifier, and a public land mobile network PLMN identifier that are corresponding to a network slice prohibited from being accessed by the terminal device; a network slice identifier, a cell identity, a tracking area identifier or code, a paging area identifier, and a PLMN identifier that are corresponding to a network slice allowed to be accessed by the terminal device; a network slice reselection policy; and security information and service information that are corresponding to the at least one network slice in the first network slice set, where the network slice reselection policy is used to indicate a manner of selecting a network slice for the terminal device by a network node.

In a possible implementation, the first response message further includes at least one of the following: allowed-to-be-established service information and/or not-allowed-to-be-established service information that are/is corresponding to the at least one network slice in the second network slice set.

In a possible implementation, the second network node is the second access-network node, and the method further includes: sending, by the first network node, a first request message to the second network node, where the first request message is used to request to obtain information about a network slice supported by the second network node, and the first request message includes information about a network slice supported by the first network node; and receiving, by the first network node, a first request response message sent by the second network node, where the first request response message includes the information about the network slice supported by the second network node.

Therefore, when the first network node and the second network node are both access-network nodes, the first network node and the second network node may exchange information about a network slice supported by each other. For example, the first network node may send the first request message to the second network node, and the first request message may be used to request to obtain the information about the network slice supported by the second network node. Optionally, the first request message may further include the information about the network slice supported by the first network node. The second network node may reply with the first request response message, and the first request response message may include the information about the network slice supported by the second network node.

Likewise, any two access-network nodes in a communications system may exchange statuses of network slices supported by the two access-network nodes in the foregoing manner. For example, an access-network node currently accessed by the terminal device may obtain, in the foregoing manner, a status of a network slice supported by an access-network node to be accessed by the terminal device, so as to select an appropriate network slice for the terminal device based on the status of the network slice supported by the access-network node to be accessed.

According to a second aspect, a communication method is provided. The communication method includes: receiving, by a second network node, a first message sent by a first network node, where the first message includes a network slice identifier corresponding to at least one network slice in a first network slice set, the network slice in the first network slice set is a network slice that is selected for a terminal device and that is used for access by the terminal device, the first network node is a first access-network node that is currently accessed by the terminal device, the second network node is a first core-network node or a second access-network node to be accessed by the terminal device, and the first core-network node is a core-network node of a communications system to which the first network node belongs; and sending, by the second network node, a first response message to the first network node, where the first response message includes a network slice identifier corresponding to at least one network slice in a second network slice set, the second network slice set is a set of network slices that are used for access by the terminal device and that are determined by the second network node based on a status of a network slice supported by the second access-network node and the network slice identifier corresponding to the at least one network slice in the first network slice set, or the second network slice set is a set of network slices that are used for access by the terminal device and that are determined by a second core-network node based on a status of a network slice supported by the second access-network node and the network slice identifier corresponding to the at least one network slice in the first network slice set: and the second core-network node is a core-network node of a communications system to which the second access-network node belongs.

Therefore, according to the communication method in this embodiment of this application, the second network node may receive the first message sent by the first network node, where the first message includes the network slice identifier corresponding to the at least one network slice in the first network slice set. Based on the network slice identifier corresponding to the at least one network slice in the first network slice set included in the first message, the second network node may determine the network slice identifier corresponding to the at least one network slice in the second network slice set. Because the network slice identifier corresponding to the at least one network slice in the second network slice set is determined based on the status of the network slice supported by the second access-network node to be accessed by the terminal device, when the terminal device is handed over from the first access-network node to the second access-network node, the status of the network slice supported by the second access-network node can be considered, to determine a network slice that is supported by the second access-network node and that is to be accessed by the terminal device, thereby ensuring smooth handover.

Optionally, the first message may be a handover request message, or if the second network node is the second access-network node, the first message may alternatively be another message used for communication between the first access-network node and the second access-network node, or if the second network node is the first core-network node, the first message may alternatively be another message used for communication between the first access-network node and the first core-network node.

Correspondingly, the first response message may be a handover request acknowledgment message, or if the second network node is the second access-network node, the first response message may alternatively be another message used for communication between the first access-network node and the second access-network node, or if the second network node is the first core-network node, the first response message may alternatively be another message used for communication between the first access-network node and the first core-network node.

In a possible implementation, the second network slice set is determined by the first core-network node or the second core-network node, the first response message further includes a first non-access stratum NAS message, the first NAS message includes the network slice identifier corresponding to the at least one network slice in the second network slice set, the first NAS message is used to instruct the terminal device to initiate a network slice reselection process, and the first response message including the first NAS message is used to send the NAS message to the terminal device by the first network node.

Optionally, the second network slice set may be determined by the core-network node in the communications system to which the first network node belongs, namely, the first core-network node. In this case, the first access-network node and the second access-network node belong to a same communications system. Alternatively, the second network slice set may be determined by the core-network node in the communications system to which the second access-network node belongs, namely, the second core-network node. When the first response message is determined by a core-network node (the first core-network node or the second core-network node), the first response message may further include the first NAS message, where the first NAS message includes the network slice identifier corresponding to the at least one network slice in the second network slice set determined by the core-network node. After receiving the first response message including the first NAS message, the first network node may transmit the first NAS message to the terminal device, so that the terminal device may initiate the network slice reselection process after receiving the first NAS message.

In a possible implementation, the second network node is the second access-network node, the first core-network node and the second core-network node are a same core-network node, and the method further includes: sending, by the second network node, a fourth message to the first core-network node, where the fourth message includes the network slice identifier corresponding to the at least one network slice in the first network slice set; and receiving, by the second network node, a fourth response message sent by the first core-network node, where the fourth response message includes the first NAS message and the network slice identifier corresponding to the at least one network slice in the second network slice set, the first NAS message includes the network slice identifier corresponding to the at least one network slice in the second network slice set, and the first NAS message is used to instruct the terminal device to initiate a network slice reselection process.

In other words, if the second network node receiving the first message is the second access-network node, after receiving the first message sent by the first access-network node, the second access-network node may determine, based on the network slice identifier corresponding to the at least one network slice in the first network slice set included in the first message, the network slice identifier corresponding to the at least one network slice in the second network slice set. Alternatively, the second access-network node may request a core-network node in the communications system to which the second access-network node belongs, namely, the first core-network node, to determine the network slice identifier corresponding to the at least one network slice in the second network slice set.

In a possible implementation, the method further includes: receiving, by the second network node, a fifth message sent by the terminal device, where the fifth message includes a second NAS message, the second NAS message includes the network slice identifier corresponding to the at least one network slice in the second network slice set, and the second NAS message is used to indicate that the terminal device has updated stored network slice information to the network slice identifier corresponding to the at least one network slice in the second network slice set; and sending, by the second network node, a sixth message to the second core-network node, where the sixth message includes the second NAS message.

The second NAS message is generated based on the first NAS message, and after receiving the second NAS message, the second network node may send the second NAS message to a corresponding core-network node.

In a possible implementation, the first message further includes at least one of the following: a network slice priority; a network slice identifier, a cell identity, a tracking area identifier or code, a paging area identifier, and a public land mobile network PLMN identifier that are corresponding to a network slice prohibited from being accessed by the terminal device; a network slice identifier, a cell identity, a tracking area identifier or code, a paging area identifier, and a PLMN identifier that are corresponding to a network slice allowed to be accessed by the terminal device; a network slice reselection policy; and security information and service information that are corresponding to the at least one network slice in the first network slice set, where the network slice reselection policy is used to indicate a manner of selecting a network slice for the terminal device by a network node.

In a possible implementation, the first response message further includes at least one of the following: allowed-to-be-established service information and/or not-allowed-to-be-established service information that are/is corresponding to the at least one network slice in the second network slice set.

In a possible implementation, the first core-network node and the second core-network node are different core-network nodes, the second network node is the first core-network node, and the method further includes: sending, by the second network node, a seventh message to the second core-network node, where the seventh message includes the network slice identifier corresponding to the at least one network slice in the first network slice set; and receiving, by the second network node, a seventh response message sent by the second core-network node, where the seventh response message includes the network slice identifier corresponding to the at least one network slice in the second network slice set.

In other words, if the second network node receiving the first message sent by the first network node is the first core-network node, the first core-network node may directly determine, based on the network slice identifier corresponding to the at least one network slice in the first network slice set included in the first message, the network slice identifier corresponding to the at least one network slice in the second network slice set. Alternatively, if the first core-network node and the second core-network node are different core-network nodes, the first core-network node may request the second core-network node to determine the network slice identifier corresponding to the at least one network slice in the second network slice set.

In a possible implementation, if the second network node is the second access-network node, the method may further include: receiving, by the second network node, a first request message sent by the first network node, where the first request message is used to request to obtain information about a network slice supported by the second network node, and the first request message includes information about a network slice supported by the first network node; and sending, by the second network node, a first request response message to the first network node, where the first request response message includes the information about the network slice supported by the second network node.

Therefore, when the first network node and the second network node are both access-network nodes, the first network node and the second network node may exchange information about a network slice supported by each other. For example, the first network node may send the first request message to the second network node, and the first request message may be used to request to obtain the information about the network slice supported by the second network node. Optionally, the first request message may further include the information about the network slice supported by the first network node. The second network node may reply with the first request response message, and the first request response message may include the information about the network slice supported by the second network node.

Likewise, any two access-network nodes in a communications system may exchange statuses of network slices supported by the two access-network nodes in the foregoing manner. For example, an access-network node currently accessed by the terminal device may obtain, in the foregoing manner, a status of a network slice supported by an access-network node to be accessed by the terminal device, so as to select an appropriate network slice for the terminal device based on the status of the network slice supported by the access-network node to be accessed.

According to a third aspect, a communication method is provided. The communication method includes: sending, by a terminal device, a third message to a first network node, where the third message includes a network slice identifier corresponding to each network slice in a first network slice set, each network slice in the first network slice set is a network slice that is selected for the terminal device and that is used for access by the terminal device, and the first network node is a first access-network node that is currently accessed by the terminal device; receiving, by the terminal device, a second message sent by the first network node, where the second message includes a first non-access stratum NAS message, the first NAS message includes a network slice identifier corresponding to each network slice in a second network slice set, and the second network slice set is a set of network slices that are used for access by the terminal device and that are determined by a second network node based on a status of a network slice supported by a second access-network node and a network slice identifier corresponding to at least one network slice in the first network slice set, or the second network slice set is a set of network slices that are used for access by the terminal device and that are determined by a second core-network node based on a status of a network slice supported by a second access-network node and the network slice identifier corresponding to the at least one network slice in the first network slice set, and the second core-network node is a core-network node of a communications system to which the second access-network node belongs.

In a possible implementation, the method further includes: sending, by the terminal device, a fifth message to the second access-network node, where the fifth message includes a second NAS message, the second NAS message includes the network slice identifier corresponding to each network slice in the second network slice set, and the second NAS message is used to indicate that the terminal device has updated stored network slice information to the network slice identifier corresponding to each network slice in the second network slice set.

According to a fourth aspect, a communication method is provided. The communication method includes: sending, by a terminal device, a third message to a first network node, where the third message includes a network slice identifier corresponding to each network slice in a first network slice set, each network slice in the first network slice set is a network slice that is selected for the terminal device and that is used for access by the terminal device, and the first network node is a first access-network node currently accessed by the terminal device; and receiving, by the terminal device, a second message sent by the first network node, where the second message includes at least one of the following: redirection cell information and a network slice identifier corresponding to a network slice that is in the first network slice set and for which connection establishment is rejected. The redirection cell information indicates information about a cell that is selected by the first network node for the terminal device and that is to be reaccessed by the terminal device.

According to a fifth aspect, a communications apparatus is provided, and is configured to execute the method according to the first aspect and any possible implementation of the first aspect, or the method according to the second aspect and any possible implementation of the second aspect, or the method according to the third aspect and any possible implementation of the third aspect, or the method according to the fourth aspect and any possible implementation of the fourth aspect. Specifically, the communications apparatus may include a unit configured to implement the method according to the first aspect and any possible implementation of the first aspect, or a unit configured to implement the method according to the second aspect and any possible implementation of the second aspect, or a unit configured to implement the method according to the third aspect and any possible implementation of the third aspect, or a unit configured to implement the method according to the fourth aspect and any possible implementation of the fourth aspect.

According to a sixth aspect, a communications device is provided, and includes a memory and a processor. The memory is configured to store a computer program. The processor is configured to invoke the computer program in the memory and run the computer program, so that the communications device executes the method according to the first aspect and any possible implementation of the first aspect, or the method according to the second aspect and any possible implementation of the second aspect, or the method according to the third aspect and any possible implementation of the third aspect, or the method according to the fourth aspect and any possible implementation of the fourth aspect.

According to a seventh aspect, a computer program product is provided, and the computer program product includes computer program code. When the computer program code is executed by a communications unit, a processing unit, a transceiver, or a processor of a communications device (for example, a network device or a terminal device), the communications device executes the methods according to the first to the fourth aspects, or any possible implementation of the first to the fourth aspects.

According to an eighth aspect, a computer-readable storage medium is provided. The computer-readable storage medium stores a program, and the program causes user equipment to execute the methods according to the first to the fourth aspects, or any possible implementation of the first to the fourth aspects.

DESCRIPTION OF EMBODIMENTS

The following describes the technical solutions of this application with reference to accompanying drawings.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from one components interacting with another component in a local system, a distributed system, and/or across a network such as the Internet interacting with other systems by using the signal).

It should be understood that the embodiments of this application can be applied to various communications systems that support a network slicing architecture, for example, a global system for mobile communications (Global System for Mobile communications, GSM) system, a code division multiple access (Code Division Multiple Access, CDMA) system, a wideband code division multiple access (Wideband Code Division Multiple Access, WCDMA) system, a general packet radio service (General Packet Radio Service, GPRS) system a long term evolution (Long Term Evolution, LTE) system, an advanced long term evolution (Advanced long term evolution, LTE-A) system, a universal mobile telecommunications system (Universal Mobile Telecommunications System, UMTS), or a next-generation communications system, for example, a new radio (New Radio, NR) system, and an evolved LTE (evolved LTE, eLTE) system.

Figure 1:
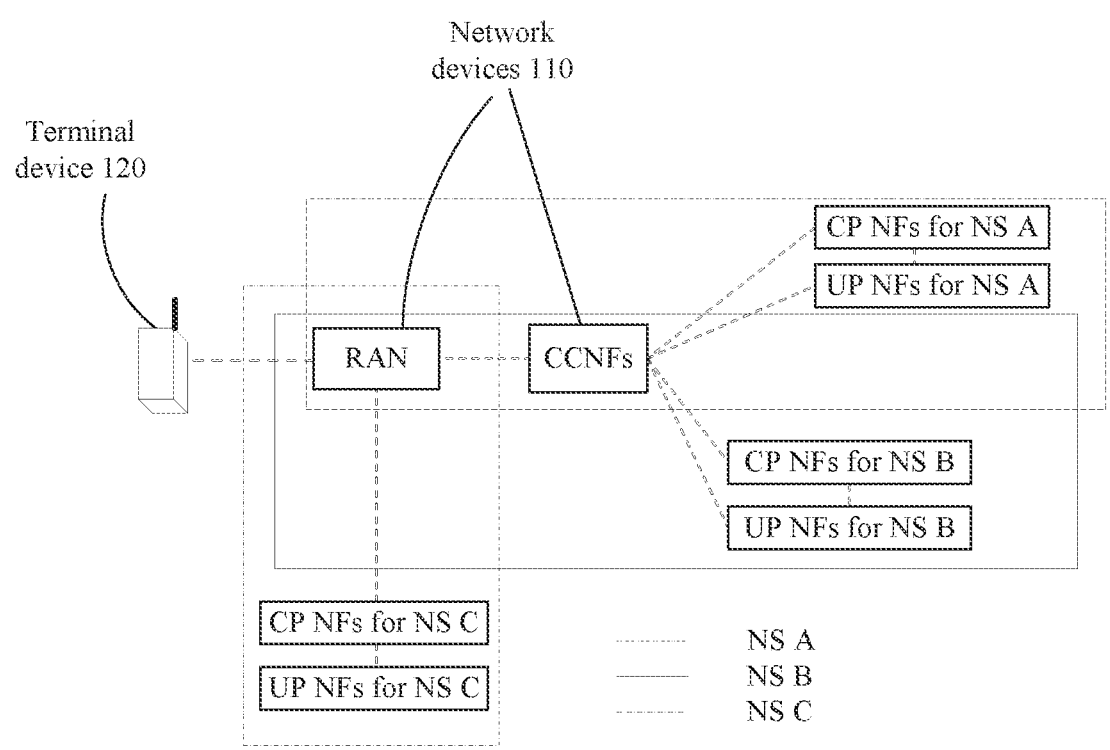
FIG. 1 is a schematic diagram of a wireless communications system according to an embodiment of this application.

FIG. 1 shows a wireless communications system 100 to which an embodiment of this application applies. The wireless communications system 100 may include a network device 110. The network device 110 may be a radio access network (Radio Access Network, RAN) device or a core network (Core Network, CN) device that communicates with a mobile device. The RAN device may be an access point (ACCESS POINT, AP) in a WLAN, a base transceiver station (Base Transceiver Station, BTS) in GSM or CDMA, a NodeB (NodeB, NB) in WCDMA, an evolved NodeB (Evolved Node B, eNB or eNodeB) in LTE, a relay node, an access point, an in-vehicle device, a wearable device, a network device in a future 5G network, or a network device in a future evolved PLMN network, for example, a base station that can be connected to a 5G core-network device, a transmission and reception point (Transmission and Reception Point, TRP), a centralized unit (Centralized Unit, CU), or a distributed unit (Distributed Unit, DU). The CN device may be a mobility management entity (Mobility Management Entity, MME) or a gateway (Gateway) in the LTE, and may be further a control plane (Control Plane, CP) network function (Network Function, NF), and a user plane (User Plane, UP) network function in a 5G network, for example, a common CP NF (Common CP NF, CCNF), a session management NF (Session Management NF, SMF), or the like.

The communications system in this embodiment of this application supports a network slicing architecture, and network slices in the communications system may share a network device and/or a network resource, or may exclusively occupy a network device and/or a network resource. For example, a network slice A (NS A for short) and a network slice B (NS B for short) shown in FIG. 1 may share a RAN and a CCNFs, and a network slice C (NS C for short) may exclusively occupy a network device RAN, and does not share a CN device with another network slice.

In addition, in this embodiment of this application, a network device provides a service for a cell, and a terminal device communicates with the network device by using a transmission resource (for example, a frequency domain resource or a spectrum resource) used by the cell. The cell may be a cell corresponding to the network device (for example, a base station), and the cell may be a macro base station, a hyper cell, or may be a base station corresponding to a small cell (small cell). The small cell herein may include: a metro cell (Metro cell), a micro cell (Micro cell), a pico cell (Pico cell), a femto cell (Femto cell), and the like. These small cells feature small coverage and low transmit power, and are applicable to high-rate data transmission services.

The wireless communications system 100 further includes at least one terminal device 120 located within coverage of the network device 110. The terminal device may also be referred to as user equipment (User Equipment, UE), an access terminal, a subscriber unit, a subscriber station, a mobile station, a remote station, a remote terminal, a mobile device, a user terminal, a terminal, a wireless communications device, a user agent, or a user apparatus. The terminal device may be a station (STATION, ST) in a wireless local area network (Wireless Local Area Network, WLAN), a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a relay device, a computing device, another processing device connected to a wireless modem, an in-vehicle device, a wearable device, a terminal device in a next-generation communications system, for example, a fifth-generation (fifth-generation, 5G) network, a terminal device in a future evolved public land mobile network (Public Land Mobile Network, PLMN) network, or the like.

As an example instead of a limitation, in this embodiment of this application, the terminal device may also be a wearable device. A wearable device may also be referred to as a wearable smart device, and is a generic name for devices that are wearable and that are developed by applying a wearable technology to perform intelligent design for daily wear, such as glasses, gloves, a watch, clothing, or shoes. A wearable device is a portable device that is directly worn on a human body or integrated with clothes or an accessory of a user. The wearable device is not merely a hardware device, and implements powerful functions through software support, data exchange, and cloud-based interaction. In a broad sense, wearable smart devices have a full range of functions and a large size, and do not rely on smartphones to implement all or some functions, for example, smart watches and smart glasses; or wearable smart devices focus on only one type of application function and need to work with other devices such as smartphones, for example, various smart bands and smart jewelry for body signs monitoring.

A communication method and a communications apparatus provided in the embodiments of this application may be applied to a network device. The network device may include an access-network device and a core-network device, and the network device includes a hardware layer, an operating system layer running on the hardware layer, and an application layer running on the operating system layer. The hardware layer includes hardware such as a central processing unit (Central Processing Unit, CPU), a memory management unit (Memory Management Unit, MMU), and a memory (also referred to as a main memory). The operating system may be any one or more types of computer operating systems that implement service processing by using a process (Process), such as a Linux operating system, a Unix operating system, an Android operating system, an iOS operating system, or a Windows operating system. The application layer includes applications such as a browser, an address book, word processing software, or instant messaging software. In addition, in the embodiments of this application, a specific structure of an execution body of the communication method is not particularly limited in the embodiments of this application, provided that communication can be implemented by using a program that runs code recording the communication method in the embodiments of this application and based on the communication method in the embodiments of this application. For example, the execution body of the communication method in the embodiments of this application may be a network device, or a functional module in the network device that can invoke the program and execute the program.

In addition, aspects or features of the embodiments of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (Compact Disc, CD), a digital versatile disc (Digital Versatile Disc, DVD)), a smart card and a flash memory component (for example, an erasable programmable read-only memory (Erasable Programmable Read-Only Memory, EPROM), a card, a stick, or a key drive). In addition, various storage media described in this specification may indicate one or more devices and/or other machine-readable media that are used to store information. The term "machine-readable media" may include but is not limited to a radio channel, and various other media that can store, contain, and/or carry an instruction and/or data.

The following describes in detail the communication method in the embodiments of this application with reference to FIG. 2 to FIG. 6.

It should be understood that FIG. 2 to FIG. 6 are schematic flowcharts of the communication method in the embodiments of this application, and show detailed communication steps or operations of the method. However, these steps or operations are merely examples. In the embodiments of this application, other operations or variations of the operations in FIG. 2 to FIG. 6 may alternatively be performed. In addition, each step in FIG. 2 to FIG. 6 may be performed according to a sequence different from that presented in FIG. 2 to FIG. 6, and possibly not all operations in FIG. 2 to FIG. 6 need to be performed.

Figure 2:
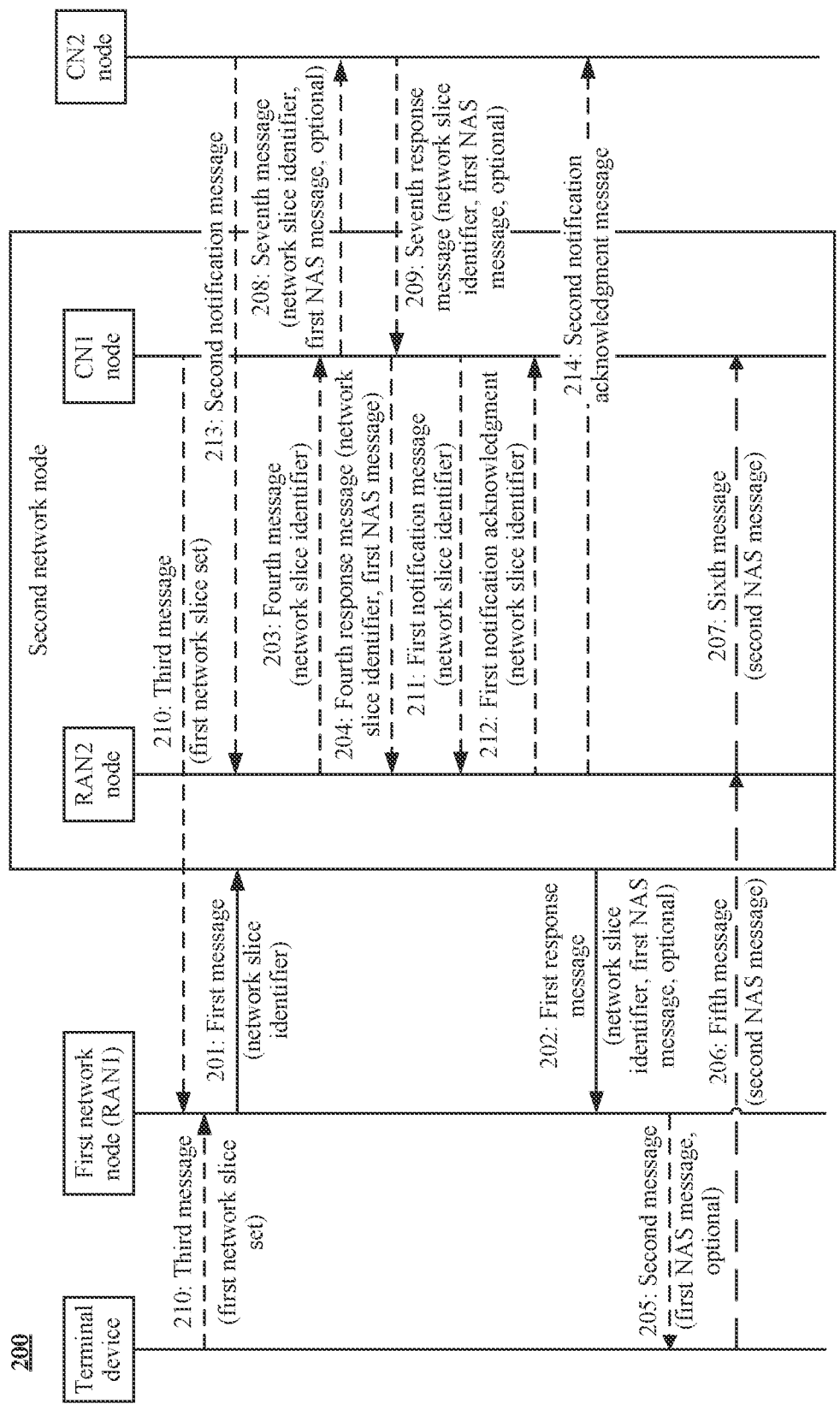
FIG. 2 is a schematic interaction diagram of a communication method according to an embodiment of this application.

FIG. 2 is a schematic interaction diagram of a communication method 200 according to an embodiment of this application. The communication method 200 is described from a perspective of equipment interaction. The method 200 may be applied to the communications system 100 shown in FIG. 1.

As shown in FIG. 2, in 201, a first network node may send a first message to a second network node.

In 202, the first network node receives a first response message sent by the second network node.

The first network node is a first access-network node (hereinafter referred to as an "RAN1 node") that is currently accessed by a terminal device, and the second network node may be a first core-network node, where the first core-network node (hereinafter referred to as a "CN1 node") is a core-network node in a communications system to which the RAN1 node belongs, or the second network node may be a second access-network node (hereinafter referred to as an "RAN2") to be accessed by the terminal device.

Further, the first message includes a network slice identifier corresponding to at least one network slice in a first network slice set (for ease of distinguishing and description, denoted as an NS Set1). Each network slice is corresponding to one network slice identifier. The first message may include network slice identifiers corresponding to some or all network slices in the first network slice set. The at least one network slice in the first network slice set in the first message may also be considered as one set (for ease of description and interpretation, denoted as an NS Set1-RAN1). Specifically, the NS Set1-RAN1 is a subset of the NS Set1, and the NS Set1-RAN1 may include some or all network slices in the NS Set1.

The first response message includes a network slice identifier corresponding to at least one network slice in a second network slice set (for ease of distinguishing and description, denoted as an NS Set2). The second network slice set may be a network slice that is determined by the second network node and that is used for access by the terminal device. Alternatively, the second network slice set includes a network slice that is determined by a second core-network node (hereinafter referred to as a "CN2 node") and that is used for access by the terminal device. The CN2 node is a core-network node in a communications system to which the RAN2 belongs. In other words, the second network slice set may be determined by the RAN2, may be determined by the CN1, or may be determined by the CN2. When the RAN1 and the RAN2 belong to a same communications system, the CN1 and the CN2 are a same core-network node.

Particularly, for ease of description and interpretation, when the second network slice set is determined by the RAN2, the NS Set2 is denoted as an NS Set2-RAN2; when the second network slice set is determined by the CN1, the NS Set2 is denoted as an NS Set2-CN1; and when the second network slice set is determined by the CN2, the NS Set2 is denoted as an NS Set2-CN2.

Optionally, the RAN1 node and the RAN2 node may be network devices in the wireless communications system shown in FIG. 1, for example, a base station in a 5G system, a base station in an eLTE system, or a base station in an LTE system that can be connected to a 5G core network. The CN1 node and the CN2 node may be core-network devices in the 5G system or core-network devices in the eLTE system. The terminal device may be the terminal device in the wireless communications system shown in FIG. 1.

Specifically, network slices that the terminal device wants to access (or, selects to access or is capable of accessing) form the first network slice set, namely, the NS Set1. Each network slice in the NS Set1 is corresponding to one network slice identifier. The network slice identifier of each network slice may be represented by using at least one of the following parameters:

1. Network slice type information: for example, the network slice type information may indicate a network slice type such as an Enhanced Mobile Broadband (enhanced Mobile BroadBand, eMBB) service, ultra-reliable and low latency communications (Ultra-Reliable Low Latency Communications, URLLC), and massive machine type communications (massive Machine Type Communication, mMTC). Optionally, the network slice type information may also indicate an end-to-end network slice type, including a RAN-to-CN network slice type, a RAN-side network slice type, or a CN-side network slice type;
2. Service type information: related to a specific service; for example, the service type information may indicate a service characteristic of a video service, an Internet-of-Vehicles service, a voice service, and the like, or information about a specific service;
3. Tenant (Tenant) information: used to indicate information about a client who creates or leases a network slice, for example, Tencent or the State Grid:
4. User group information; used to indicate group information of grouping a user based on a characteristic, for example, a user level;
5. Slice group information; used to indicate a network slice group that is formed based on a characteristic, for example, all network slices that can be accessed by the terminal device are used as a slice group, or a network slice group is classified according to another standard;
6. Network slice instance information: used to indicate an instance identifier and characteristic information that are created for the network slice. For example, an identifier can be allocated for a network slice instance, and is used to indicate the network slice instance; alternatively, a new identifier can be mapped on a basis of the network slice instance identifier, to associate the network slice instance, so that a recipient can identify, based on the identifier, a specific network slice instance indicated by the identifier; and
7. Dedicated core network (Dedicated Core Network, DCN) identifier: The identifier is used to uniquely indicate a dedicated core network in the LTE system or the eLTE system, for example, a dedicated core network in the Internet of Things. Optionally, mapping may be performed on the DCN identifier and a network slice identifier, so that the network slice identifier may be obtained through mapping based on the DCN identifier, or the DCN identifier may be obtained through mapping based on the network slice identifier.

It should be understood that in this embodiment of this application, for each network slice in the first network slice set or the second network slice set, at least one of the foregoing parameters may be used to represent a network slice identifier corresponding to each network slice. For example, the network slice identifier of each network slice can be represented by using a network slice type, may be represented by using a network slice type and a service type, or may be represented by using a service type along with tenant information. This is not limited in this embodiment of this application. Details about how to represent a network slice identifier corresponding to a network slice are not described below again.

Optionally, a specific form of encoding the network slice identifier corresponding to the at least one network slice in the first network slice set included in the first message is not limited. The network slice identifier corresponding to the at least one network slice may be carried in different fields of the first message to represent different network slice identifiers, or the network slice identifier corresponding to the at least one network slice may be replaced by using an abstracted index value, where different index values are corresponding to different network slices.

Optionally, the first message may be a handover request (Handover Request) message. Alternatively, if the second network node is the RAN2 node, the first message may be another message used for communication between the RAN1 node and the RAN2 node. Alternatively, if the second network node is the CN1 node, the first message may be a handover required (Handover Required) message, or may be another message used for communication between the RAN1 node and the CN1 node.

Correspondingly, the first response message may be a handover request acknowledgment (Handover Request Acknowledge) message. Alternatively, if the second network node is the RAN2 node, the first response message may be another message used for communication between the RAN1 node and the RAN2 node. Alternatively, if the second network node is the CN1 node, the first response message may be a handover command (Handover Command) message, or may be another message used for communication between the RAN1 node and the CN1 node.

Optionally, in an embodiment, before 201, the method 200 may further include 210. In 210, the first network node receives a third message sent by the terminal device or the first core-network node. The third message includes the network slice identifier corresponding to each network slice in the first network slice set.

In other words, the first network slice set includes network slices that the terminal device needs to access, the third message may include network slice identifiers corresponding to the network slices in the first network slice set, and the RAN1 node may determine, based on the third message, the network slice identifiers corresponding to the network slices in the first network slice set. The third message may be sent by the terminal device, or sent by the first core-network node. Specifically, the network slice identifiers corresponding to the network slices in the first network slice set may be notified to the RAN1 node by the terminal device, or may be notified to the RAN1 node by the first core-network node, namely, the CN1 node.

Specifically, if the third message is sent by the terminal device, the third message may be a radio resource control connection request ((Radio Resource Control, RRC) Connection Request), an RRC connection reestablishment request (RRC Connection Reestablishment Request), or an RRC connection setup complete (RRC Connection Setup Complete) message, where the RRC connection request is used to request to establish a connection to the network device, the RRC connection reestablishment request is used to request to re-establish a connection to the network device, and the RRC connection setup complete message is used to indicate that establishment of the connection to the network device is completed.

Alternatively, if the third message is sent by the CN1 node, the third message may be a message that requests to establish an interface between the RAN1 node and the CN1 node, an initial UE context setup message, or another message used for communication between a RAN node and a CN node. The CN1 node may proactively send the third message to the RAN1 node, or may send the third message to the RAN1 node based on a request message of the RAN1 node.

Figure 3:
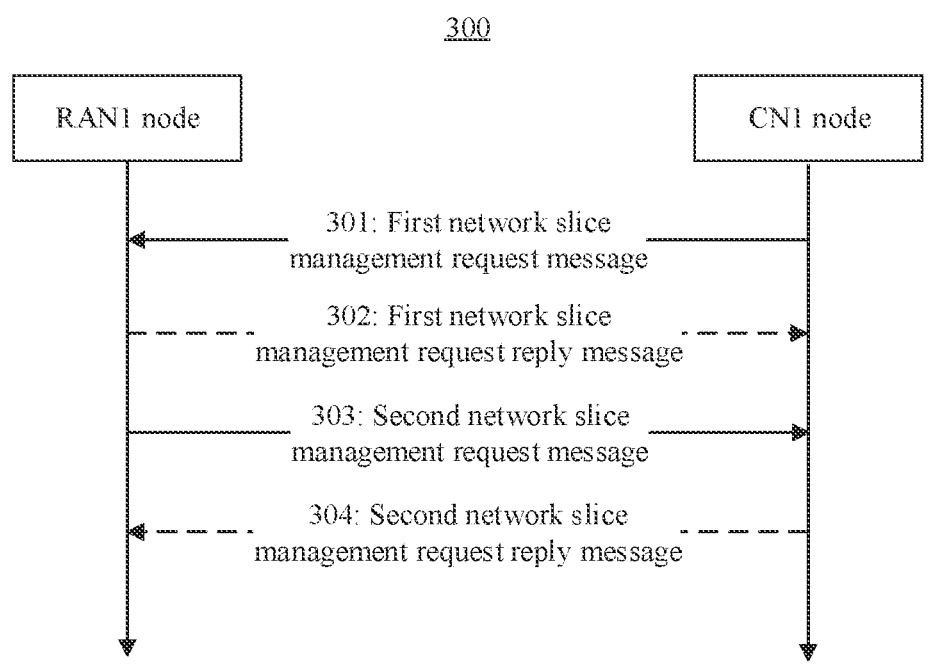
FIG. 3 is a schematic interaction diagram of a communication method according to another embodiment of this application.

FIG. 3 is a schematic interaction diagram of a communication method according to another embodiment of this application. In a manner shown in FIG. 3, a RAN1 node may obtain, from a CN1 node, information about a network slice that a terminal device needs to access (or selects to access or is required to access).

As shown in FIG. 3, the method 300 may include the following steps.

In 301, the CN1 node may send a first network slice management request message to the RAN1 node. Optionally, the first network slice management request message may be used for context management, service management, load management, and the like of the terminal device. The first network slice management request message may be an initial UE context setup message, a bearer establishment request, or another message used for communication between a RAN node and a CN node. This is not limited in this embodiment of this application.

Optionally, the first network slice management request message may include at least one of the following:

1. An identifier corresponding to the terminal device: The identifier corresponding to the terminal device may be identification information that can uniquely identify the terminal device, such as an international mobile subscriber identity (International Mobile Subscriber Identification number, IMSI), a temporary mobile subscriber identity (Temporary Mobile Subscriber Identification number, TMSI), or a random number;

2. A frequency priority and an access technology priority that are corresponding to at least one network slice in a first network slice set: used for terminal mobility management; for example, the terminal may determine a priority for cell selection or reselection based on the frequency priority, to select a target cell with a high frequency priority;

3. A priority corresponding to the at least one network slice in the first network slice set: used for mobility management, admission control, and the like of the terminal device; for example, the terminal device may consider to support a high-priority cell in cell selection or cell reselection when the terminal device is in an idle state or an inactive state. At a handover preparation stage, a source-side RAN node may preferably consider to support a neighboring RAN node in a high-priority network slice as a target-side RAN node for handover, and the target-side RAN node may further preferably admit a service bearer corresponding to the high-priority network slice;

4. Configuration information related to a closed subscriber group (Closed Subscriber Group) corresponding to the at least one network slice in the first network slice set: for example, a CSG member status, used to indicate whether the terminal is a CSG member;

5. Trace (trace) information corresponding to the at least one network slice in the first network slice set: used for device commissioning, for example, trace start, trace end, and cell service trace;
6. A minimization of drive tests (Minimization of Drive Tests, MDT) parameter corresponding to the at least one network slice in the first network slice set: for example, whether the minimization of drive tests is allowed, a list of public land mobile networks (Public Land Mobile Network, PLMN), cells, and tracking areas that allow the minimization of drive tests:
7. Service information corresponding to the at least one network slice in the first network slice set: for example, information about bearer-related, session-related, and stream-related establishment, modification, or release;
8. Load information corresponding to the at least one network slice in the first network slice set: for example, service reduction indication information used to instruct the RAN node to perform load control, or overload end indication information used to indicate end of load control of the network slice;
9. A network slice identifier corresponding to a network slice prohibited from being accessed or allowed to be accessed by the terminal device: used to indicate at least one network slice prohibited from being accessed or allowed to be accessed by the terminal device;
10. A cell identity corresponding to a network slice prohibited from being accessed or allowed to be accessed by the terminal device: used to indicate at least one cell corresponding to the network slice prohibited from being accessed or allowed to be accessed by the terminal device. Optionally, the cell identity corresponding to the network slice prohibited from being accessed or allowed to be accessed by the terminal device may be sorted based on a network slice priority, and may be used for terminal device mobility management. For example, the terminal device may preferably select or reselect a high-priority cell when the terminal device is in an idle state or an inactive state. At a handover preparation stage, a source-side RAN network element may preferably consider to support a neighboring RAN network element in which the high-priority cell is located as a target-side RAN network element;
11. A tracking area identifier or code corresponding to a network slice prohibited from being accessed or allowed to be accessed by the terminal device: used to indicate at least one tracking area prohibited from being accessed or allowed to be accessed by the terminal device. Optionally, a tracking area identifier or code in the tracking area identifier or code corresponding to the network slice prohibited from being accessed or allowed to be accessed by the terminal device may be sorted based on a network slice priority, and may be used for terminal device mobility management. For example, the terminal device may preferably select or reselect a cell in which a high-priority tracking area is located when the terminal device is in an idle state or an inactive state. At a handover preparation stage, a source-side RAN network element may preferably consider a neighboring RAN network element in which the high-priority area is located as a target-side RAN network element;
12. A paging area identifier corresponding to the network slice prohibited from being accessed or allowed to be accessed by the terminal device: used to indicate at least one paging area of a core network and/or access network prohibited from being accessed or allowed to be accessed by the terminal device. Optionally, the paging area identifier corresponding to the network slice prohibited from being accessed or allowed to be accessed by the terminal device may be sorted based on a network slice priority, and may be used for terminal device mobility management. For example, the terminal device may preferably select or reselect a cell in which a high-priority paging area is located when the terminal device is in an idle state or an inactive state. At a handover preparation stage, a source-side RAN network element may preferably consider to support a neighboring RAN network element in which the high-priority paging area is located as a target-side RAN network element;
13. A public land mobile network (Public Land Mobile Network, PLMN) identifier corresponding to a network slice prohibited from being accessed or allowed to be accessed by the terminal device: used to indicate an identifier of a PLMN that currently serves the terminal device, and/or an equivalent PLMN identifier list allowed to be accessed by the terminal device. Optionally, the PLMN identifier corresponding to the network slice prohibited from being accessed or allowed to be accessed by the terminal device may be sorted based on a network slice priority, and may be used for terminal device mobility management. For example, the terminal device may preferably select or reselect a cell in which a high-priority PLMN is located when the terminal device is in an idle state or an inactive state. At a handover preparation stage, a source-side RAN network element may preferably consider to support a neighboring RAN network element in which the high-priority PLMN is located as a target-side RAN network element; and
14. A network slice reselection policy: The network slice reselection policy may indicate whether a network device is allowed to always select one or more network slices for the terminal device, or whether the network device is allowed to select another network slice for the terminal device in a manner of handover or cell reselection. For example, for a network slice indicated by at least one network slice identifier, an identifier of at least one network slice that can replace the network slice may be included. Optionally, the identifier of the at least one network slice that can replace the network slice may be sorted based on a priority. A criterion for determining a priority is not limited in this embodiment of this application. For example, the sorting may be performed based on a network slice priority.

With reference to the foregoing descriptions, it can be learned that, if a third message is sent by a first core-network node, namely, the CN1 node, the CN1 node may send the third message to the RAN1 node by using step 301 shown in FIG. 3, to notify the RAN1 node of information about the network slice that the terminal device wants to access. In this case, the third message may be the first network slice management request message in 301 shown in FIG. 3.

Therefore, if the third message is sent by the first core-network node, namely, the CN1 node, the third message may be the first network slice management request message, so that in 201, the third message may further include at least one piece of the information included in the first network slice management request message described above, for example, the network slice identifier, the cell identity, the tracking area identifier or code, the paging area identifier, and the PLMN identifier that are corresponding to the network slice prohibited from being accessed by the terminal device; the network slice identifier, the cell identity, the tracking area identifier or code, the paging area identifier, and the PLMN identifier that are corresponding to the network slice allowed to be accessed by the terminal device; the network slice reselection policy; and security information and service information that are corresponding to the at least one network slice in the first network slice set.

Optionally, as shown in FIG. 3, in 302, the RAN1 node may further send a first network slice management request reply message to the CN1 node, where the first network slice management request reply message may indicate that the RAN1 node accepts or rejects the first network slice management request message of the CN1 node. If the RAN1 node rejects the first network slice management request message of the CN1 node, the first network slice management request reply message may further carry a rejection cause, for example, the rejection cause may be that management requests of some or all network slices in the first network slice set cannot be satisfied.

As shown in FIG. 3, in 303, the RAN1 node may further send a second network slice management request message to the CN1 node. Optionally, the second network slice management request message may be used to notify the CN1 node of information about a network slice currently supported by the RAN1 node. In this case, the second network slice management request message may include the information about the network slice supported by the RAN1 node. For detailed content of the information, refer to the foregoing descriptions. For brevity, details are not described herein again.

Optionally, the second network slice management request message may further be used for context management, service management, load management, and the like of the terminal device. In this case, the second network slice management request message may include at least one of the following:

1. A RAN node identifier: The RAN node identifier is used to uniquely identify a RAN node globally;
2. Cell information corresponding to the at least one network slice in the first network slice set: for example, a cell identity, a physical cell identity, frequency information, a tracking area identifier or code, a paging area identifier, and physical access channel configuration information that are of a serving cell, in which the at least one network slice is located, of the RAN node, and a cell identity, a physical cell identity, frequency information, a tracking area identifier or code, a paging area identifier, and physical access channel configuration information that are of a neighboring cell of each serving cell;
3. A to-be-released bearer list, a to-be-released session list, and a to-be-released stream list that are corresponding to the at least one network slice in the first network slice set: respectively used to indicate that the CN1 node needs to release a bearer, a session, or a stream that is established by the terminal device;
4. A to-be-modified bearer list, a to-be-modified session list, and a to-be-modified stream list that are corresponding to the at least one network slice in the first network slice set: respectively used to indicate that the CN1 node needs to modify related service information of a bearer, a session, or a stream that is established by the terminal device;
5. A to-be-released terminal context list corresponding to the at least one network slice in the first network slice set: used to request the CN1 node to release an interface that is established between the RAN1 node and the CN1 node and that is specific to the corresponding network slice; and
6. A to-be-modified terminal context list corresponding to the at least one network slice in the first network slice set: used to request to-be-modified context information corresponding to the network slice from the CN1 node, for example, closed subscriber group (Closed Subscriber Group. CSG) member information.

Optionally, the second network slice management request message may be a message that requests to establish an interface between the RAN1 node and the CN1 node, a UE context release message, or another message used for communication between the RAN node and the CN node. This is not limited in this embodiment of this application.

Therefore, a RAN node in a communications system may send, in a manner described in 303, a second network slice management request to a CN node in the communications system to which the RAN node belongs, to notify the CN node of information about a network slice supported by the RAN node. In this way, the CN node can perform mobility management based on the information about the network slice supported by the RAN node, for example, determine a to-be-accessed network slice for the terminal device based on the information about the network slice supported by the RAN node.

I send the second network slice management request message at a moment slightly before sending a first message. In other words, 303 is performed at a moment slightly before 201. Alternatively, 303 may be performed before 201 by a period of time. For example, the RAN1 node may send the second network slice management request message to the CN1 at a specific time, to notify the CN1 node of a status of the network slice supported by the RAN1 node, so as to facilitate subsequent mobility management by the CN1 node. In this case, when the RAN1 sends the first message to the CN1, the CN1 node may determine the to-be-accessed network slice for the terminal device based on the status of the network slice supported by the RAN1 node.

Optionally, a RAN2 node can also send a corresponding network slice management request message to the CN1 node in the manner described in 303, to notify the CN1 node of a status of a network slice supported by the RAN2 node. In other words, an access-network node in the communications system may send, in the manner described in 303, a corresponding network slice management request message to a core-network node in the communications system to which the access-network node belongs, to notify the core-network node of a status of a network slice supported by the access-network node, so that the core-network node in the communications system can select an appropriate network slice for the terminal device based on a status of a network slice supported by each access-network node.

Optionally, as shown in FIG. 3, in 304, the CN1 node may further send a second network slice management request reply message to the RAN1 node, where the second network slice management request reply message is used to indicate that the CN1 node has successfully received the second network slice management request message sent by the RAN1 node.

Optionally, in addition to the network slice identifier corresponding to each network slice in the first network slice set, a first message may further include at least one of the following:

a network slice identifier, a cell identity, a tracking area identifier or code, a paging area identifier, and a public land mobile network PLMN identifier that are corresponding to a network slice prohibited from being accessed by the terminal device; a network slice identifier, a cell identity, a tracking area identifier or code, a paging area identifier, and a PLMN identifier that are corresponding to a network slice allowed to be accessed by the terminal device; a network slice reselection policy; and security information and service information that are corresponding to the at least one network slice in the first network slice set, where the network slice reselection policy is used to indicate a manner of selecting a network slice for the terminal device by a network node.

Specifically, the network slice identifier corresponding to the network slice prohibited from being accessed or allowed to be accessed by the terminal device is used to indicate at least one network slice prohibited from being accessed or allowed to be accessed by the terminal device. The cell identity corresponding to the network slice prohibited from being accessed or allowed to be accessed by the terminal device is used to indicate at least one cell corresponding to the network slice prohibited from being accessed or allowed to be accessed by the terminal device. The tracking area identifier or code corresponding to the network slice prohibited from being accessed or allowed to be accessed by the terminal device is used to indicate at least one tracking area prohibited from being accessed or allowed to be accessed by the terminal device. Optionally, a tracking area identifier or code in the tracking area identifier or code corresponding to the network slice prohibited from being accessed or allowed to be accessed by the terminal device may be sorted based on a network slice priority, and may be used for terminal device mobility management. The paging area identifier corresponding to the network slice prohibited from being accessed or allowed to be accessed by the terminal device is used to indicate at least one paging area of a core network and/or an access network corresponding to the network slice prohibited from being accessed or allowed to be accessed by the terminal device. Optionally, a paging area identifier in the paging area identifier prohibited from being accessed or allowed to be accessed by the terminal device may be sorted based on a network slice priority, and may be used for terminal device mobility management. The PLMN identifier corresponding to the network slice prohibited from being accessed or allowed to be accessed by the terminal device is used to indicate an identifier of a PLMN that currently serves the terminal device, and/or an equivalent PLMN identifier list allowed to be accessed by the terminal device. Optionally, the PLMN identifier corresponding to the network slice prohibited from being accessed or allowed to be accessed by the terminal device may be sorted based on a network slice priority, and may be used for terminal device mobility management. The network slice reselection policy may indicate whether a network device is allowed to always select one or more network slices for the terminal device, or whether the network device is allowed to select another network slice for the terminal device in a manner of handover or cell reselection. For example, for a network slice indicated by at least one network slice identifier, an identifier of at least one network slice that can replace the network slice may be included. Optionally, the identifier of the at least one network slice that can replace the network slice may be sorted based on a priority. A criterion for determining a priority is not limited in this embodiment of this application. For example, the sorting may be performed based on a network slice priority. The security information corresponding to the at least one network slice in the first network slice set (namely, an NS Set1-RAN1) may include, for example, encryption location indication information, where the encryption location indication information may indicate whether the encryption location is located at a RAN node or a CN node, or encryption key indication information, where the encryption key indication information is used to notify the RAN2 of an encryption key used by the at least one network slice in the first network slice set.

The network slice reselection policy may indicate whether a network device is allowed to always select one or more network slices for the terminal device, or whether the network device is allowed to select another network slice for the terminal device in a manner of handover or cell reselection. For example, for a network slice indicated by at least one network slice identifier, an identifier of at least one network slice that can replace the network slice may be included. Optionally, the identifier of the at least one network slice that can replace the network slice may be sorted based on a priority. A criterion for determining a priority is not limited in this embodiment of this application. For example, the sorting may be performed based on a network slice priority.

The service information corresponding to the at least one network slice in the first network slice set (namely, the NS Set1-RAN1) may include at least one of the following:
1. Bearer information corresponding to a network slice that needs to be established or to be admitted in the NS Set1-RAN1: for example, a bearer identifier, a bearer-level quality-of-service (Quality-of-Service, QoS) parameter, or a tunnel termination point;
2. Session information corresponding to a network slice that needs to be established or to be admitted in the NS Set1-RAN1: for example, a session identifier, a session-level QoS parameter, or a tunnel termination point; and
3. Stream information corresponding to the network slice that needs to be established or to be admitted in the NS Set1-RAN1: for example, a stream identifier, a stream-level QoS parameter, or a tunnel termination point.

Optionally, the first message may further include a frequency priority and an access technology priority that are corresponding to the at least one network slice in the first network slice set, and the frequency priority and the access technology priority are used for terminal mobility management. For example, the terminal may determine a priority for cell selection or reselection based on the frequency priority, to select a target cell with a high frequency priority.

Optionally, the first message may further include a priority corresponding to the at least one network slice in the first network slice set, and the priority is used for mobility management, admission control, and the like of the terminal device. The terminal device may consider to support a high-priority cell in cell selection or cell reselection when the terminal device is in an idle state or an inactive state. At a handover preparation stage, a source-side RAN node may preferably consider to support a neighboring RAN node in a high-priority network slice as a target-side RAN node for handover, and the target-side RAN node may further preferably admit a service bearer corresponding to the high-priority network slice.

Optionally, the first message may further include context information of the terminal device, for example, a network slice identifier corresponding to at least one network slice subscribed to by the terminal device.

Optionally, the first message may further include a handover cause, where the handover cause is used to indicate a cause for the terminal device to be handed over from the RAN1 node to the RAN2 node. For example, the handover cause may be a cause at a wireless network layer (for example, the handover is triggered due to signal quality or resource-based optimization).

Optionally, the first message may further include a temporary identifier corresponding to the terminal device, and the temporary identifier is used to search for stored context information of the terminal device by a core-network network element.

Optionally, the first message may further include a core-network control function entity identifier associated with the terminal device.

With reference to FIG. 2, the following describes in detail how to determine a network slice identifier corresponding to at least one network slice in a second network slice set in different embodiments.

Embodiment 1: A second network node is a RAN2 node, and a second network slice set is determined by the RAN2 node and denoted as an NS Set2-RAN2.

In this case, in 201, a RAN1 node sends a first message to the RAN2 node.

In 202, the RAN1 node receives a first response message sent by the RAN2 node.

The first message includes a network slice identifier corresponding to at least one network slice in a first network slice set, and the first response message includes the network slice identifier corresponding to the at least one network slice in the second network slice set.

Specifically, the second network node that receives the first message sent by the RAN1 node is the RAN2 node. Based on the network slice identifier corresponding to the at least one network slice in the first network slice set (namely, an NS Set1-RAN1) included in the first message, the RAN2 node may directly determine the second network slice set, namely, the NS Set2-RAN2, with reference to a status of a network slice supported by the RAN2 node.

Optionally, the NS Set2-RAN2 may include some or all network slices in the NS Set1-RAN1. In other words, the NS Set2-RAN2 is a subset of the NS Set1-RAN1. A network slice that is determined by the RAN2 node and that is used for access by a terminal device may include some or all network slices in network slices that the terminal device wants to access (or is required to access, or needs to access). The RAN2 node may filter out some network slices based on the status of the network slice supported by the RAN2 node.

Optionally, the RAN2 node may alternatively reselect some or all network slices for the terminal device. In other words, the NS Set2-RAN2 may not be a subset of the NS Set1-RAN1. The NS Set2-RAN2 may also include a network slice that is not included in the NS Set1-RAN1. The network slice that is included in the NS Set2-RAN2 but not included in the NS Set1-RAN1 may be a network slice that is reselected for the terminal device by the RAN2. Alternatively, the RAN2 may update information about some or all network slices in the NS Set1-RAN1.

Optionally, the first response message includes the network slice identifier corresponding to the at least one network slice in the second network slice set. In other words, the first response message may include network slice identifiers corresponding to some or all network slices in the NS Set2-RAN2.

Optionally, in addition to the network slice identifier corresponding to the at least one network slice in the second network slice set (namely, the NS Set2-RAN2), the first response message may further include at least one of the following:

allowed-to-be-established service information and not-allowed-to-be-established service information that are corresponding to the at least one network slice in the second network slice set.

Specifically, each network slice is corresponding to corresponding service information, such as bearer information, session information, or stream information. The RAN2 may be allowed only to establish service information corresponding to some network slices, may be allowed only to establish some service information corresponding to some network nodes, or it is likely that service information corresponding to a network slice is not allowed to be established. In this case, the first response message may include allowed-to-be-established service information and/or not-allowed-to-be-established service information that are/is corresponding to the at least one network slice in the NS Set2-RAN2.

Optionally, in Embodiment 1, the first message may be a handover request message, or may be another message used for communication between a RAN node and another RAN node. Correspondingly, the first response message may be a handover request acknowledgment message, or may be another message used for communication between the RAN node and the another RAN node.

Figure 4:
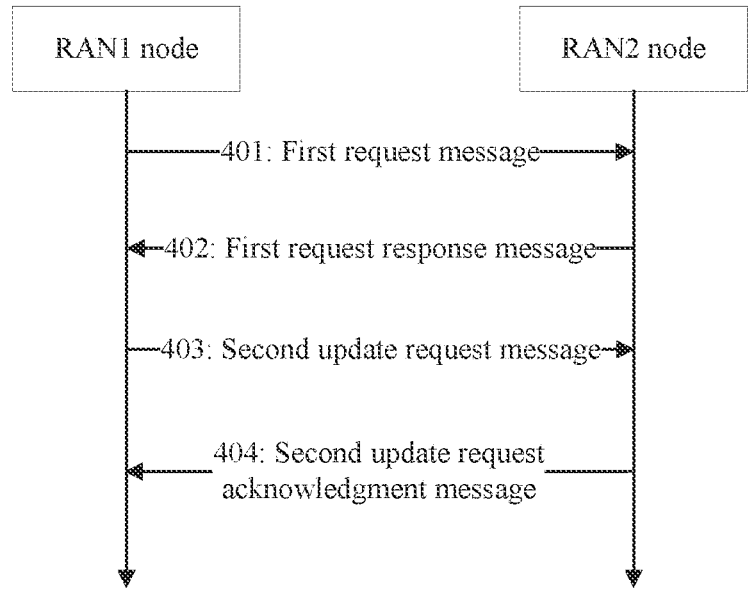
FIG. 4 is a schematic interaction diagram of a communication method according to still another embodiment of this application.

Optionally, the RAN1 node and the RAN2 node may further obtain, in advance, information about a network slice supported by each other. FIG. 4 is a schematic interaction diagram of a communication method 400 according to still another embodiment of this application. In a manner shown in FIG. 4, the RAN1 node and the RAN2 node may further obtain, in advance, information about the network slice supported by each other. As shown in FIG. 4, in 401, the RAN1 node may send a first request message to the RAN2 node, where the first request message is used for exchanging application-side configuration information between the two RAN nodes. For example, the first request message may include the following information:

1. A RAN1 node identifier: The RAN1 node identifier is used to uniquely identify the RAN1 node globally;
2. Information about a serving cell of the RAN1 node and a neighboring cell corresponding to each serving cell: for example, cell identities, physical cell identities, frequency information, tracking area identifiers or codes, and paging area identifiers that are corresponding to the serving cell and the neighboring cell corresponding to each serving cell; a network slice identifier, physical access channel configuration, or network slice mobility parameter information that is corresponding to a supported network slice, for example, a handover triggered modification parameter, where the handover triggered modification parameter is used to indicate a threshold for initiating preparation for handover from one cell to another cell;
3. A network slice identifier corresponding to a network slice prohibited from being accessed or allowed to be accessed by the terminal device: used to indicate at least one network slice prohibited from being accessed or allowed to be accessed by the terminal device;
4. A cell identity corresponding to a network slice prohibited from being accessed or allowed to be accessed by the terminal device: used to indicate at least one cell corresponding to the network slice prohibited from being accessed or allowed to be accessed by the terminal device. Optionally, the cell identity corresponding to the network slice prohibited from being accessed or allowed to be accessed by the terminal device may be sorted based on a network slice priority, and may be used for terminal device mobility management. For example, the terminal device may preferably select or reselect a high-priority cell when the terminal device is in an idle state or an inactive state. At a handover preparation stage, a source-side RAN network element may preferably consider to support a neighboring RAN network element in which the high-priority cell is located as a target-side RAN network element;

5. A tracking area identifier or code corresponding to the network slice prohibited from being accessed or allowed to be accessed by the terminal device: used to indicate at least one tracking area prohibited from being accessed or allowed to be accessed by the terminal device. Optionally, a tracking area identifier or code in the tracking area identifier or code corresponding to the network slice prohibited from being accessed or allowed to be accessed by the terminal device may be sorted based on a network slice priority, and may be used for UE mobility management. For example, the terminal device may preferably select or reselect a cell in which a high-priority tracking area is located when the terminal device is in an idle state or an inactive state. At a handover preparation stage, a source-side RAN network element may preferably consider to support a neighboring RAN network element in which the high-priority tracking area is located as a target-side RAN network element;

6. A paging area identifier corresponding to the network slice prohibited from being accessed or allowed to be accessed by the terminal device: used to indicate at least one paging area of a core network and/or access network corresponding to the network slice prohibited from being accessed or allowed to be accessed by the terminal device. Optionally, a paging area identifier corresponding to the network slice prohibited from being accessed or allowed to be accessed by the terminal device may be sorted based on a network slice priority, and may be used for terminal device mobility management. For example, the terminal device may preferably select or reselect a cell in which a high-priority paging area is located when the terminal device is in an idle state or an inactive state. At a handover preparation stage, a source-side RAN network element may preferably consider to support a neighboring RAN network element in which the high-priority paging area is located as a target-side RAN network element;

7. A public land mobile network (Public Land Mobile Network, PLMN) identifier corresponding to a network slice prohibited from being accessed or allowed to be accessed by the terminal device: used to indicate an identifier of a PLMN that currently serves the terminal device, and/or an equivalent PLMN identifier list allowed to be accessed by the terminal device. Optionally, the PLMN identifier corresponding to the network slice prohibited from being accessed or allowed to be accessed by the terminal device may be sorted based on a network slice priority, and may be used for terminal device mobility management. For example, the terminal device may preferably select or reselect a cell in which a high-priority PLMN is located when the terminal device is in an idle state or an inactive state. At a handover preparation stage, a source-side RAN network element may preferably consider to support a neighboring RAN network element in which the high-priority PLMN is located as a target-side RAN network element; and 8. A network slice reselection policy: The network slice reselection policy may indicate whether a network device is allowed to always select one or more network slices for the terminal device, or whether the network device is allowed to select another network slice for the terminal device in a manner of handover or cell reselection. For example, for a network slice indicated by at least one network slice identifier, an identifier of at least one network slice that can replace the network slice may be included. Optionally, the identifier of the at least one network slice that can replace the network slice may be sorted based on a priority. A criterion for determining a priority is not limited in this embodiment of this application. For example, the sorting may be performed based on a network slice priority.

In 402, the RAN2 node replies to the RAN1 node with a first request response message, and the first request response message may include the following information:

1. A RAN2 node identifier: The RAN2 node identifier is used to uniquely identify the RAN2 node globally;
2. Information about a serving cell of the RAN2 node and a neighboring cell corresponding to each serving cell: for example, cell identities, physical cell identities, frequency information, tracking area identifiers or codes, and paging area identifiers that are corresponding to the serving cell and the neighboring cell corresponding to each serving cell; a network slice identifier, physical access channel configuration, or network slice mobility parameter information that is corresponding to a supported network slice, for example, a handover triggered modification parameter, where the handover triggered modification parameter is used to indicate a threshold for initiating preparation for handover from one cell to another cell;
3. A network slice identifier corresponding to a network slice prohibited from being accessed or allowed to be accessed by the terminal device: used to indicate at least one network slice prohibited from being accessed or allowed to be accessed by the terminal device;
4. A cell identity corresponding to a network slice prohibited from being accessed or allowed to be accessed by the terminal device: used to indicate at least one cell corresponding to the network slice prohibited from being accessed or allowed to be accessed by the terminal device. Optionally, the cell identity corresponding to the network slice prohibited from being accessed or allowed to be accessed by the terminal device may be sorted based on a network slice priority, and may be used for terminal device mobility management. For example, the terminal device may preferably select or reselect a high-priority cell when the terminal device is in an idle state or an inactive state. At a handover preparation stage, a source-side RAN network element may preferably consider to support a neighboring RAN network element in which the high-priority cell is located as a target-side RAN network element;
5. A tracking area identifier or code corresponding to a network slice prohibited from being accessed or allowed to be accessed by the terminal device: used to indicate at least one tracking area prohibited from being accessed or allowed to be accessed by the terminal device. Optionally, the tracking area identifier or code in the tracking area identifier or code corresponding to the network slice prohibited from being accessed or allowed to be accessed by the terminal device may be sorted based on a network slice priority, and may be used for terminal device mobility management. For example, the terminal device may preferably select or reselect a cell in which a high-priority tracking area is located when the terminal device is in an idle state or an inactive state. At a handover preparation stage, a source-side RAN network element may preferably consider to support a neighboring RAN network element in which the high-priority tracking area is located as a target-side RAN network element;

6. A paging area identifier corresponding to the network slice prohibited from being accessed or allowed to be accessed by the terminal device: used to indicate at least one paging area of a core network and/or access network corresponding to the network slice prohibited from being accessed or allowed to be accessed by the terminal device. Optionally, a paging area identifier corresponding to the network slice prohibited from being accessed or allowed to be accessed by the terminal device may be sorted based on a network slice priority, and may be used for terminal device mobility management. For example, the terminal device may preferably select or reselect a cell in which a high-priority paging area is located when the terminal device is in an idle state or an inactive state. At a handover preparation stage, a source-side RAN network element may preferably consider to support a neighboring RAN network element in which the high-priority paging area is located as a target-side RAN network element;

7. A public land mobile network (Public Land Mobile Network, PLMN) identifier corresponding to a network slice prohibited from being accessed or allowed to be accessed by the terminal device: used to indicate an identifier of a PLMN that currently serves the terminal device, and/or an equivalent PLMN identifier list allowed to be accessed by the terminal device. Optionally, the PLMN identifier corresponding to the network slice prohibited from being accessed or allowed to be accessed by the terminal device may be sorted based on a network slice priority, and may be used for terminal device mobility management. For example, the terminal device may preferably select or reselect a cell in which a high-priority PLMN is located when the terminal device is in an idle state or an inactive state. At a handover preparation stage, a source-side RAN network element may preferably consider to support a neighboring RAN network element in which the high-priority PLMN is located as a target-side RAN network element; and 8. A network slice reselection policy: The network slice reselection policy may indicate whether a network device is allowed to always select one or more network slices for the terminal device, or whether the network device is allowed to select another network slice for the terminal device in a manner of handover or cell reselection. For example, for a network slice indicated by at least one network slice identifier, an identifier of at least one network slice that can replace the network slice may be included. Optionally, the identifier of the at least one network slice that can replace the network slice may be sorted based on a priority. A criterion for determining a priority is not limited in this embodiment of this application. For example, the sorting may be performed based on a network slice priority.

Optionally, when a status of a network slice supported by the RAN1 node changes, as shown in FIG. 4, in 403, the RAN1 may further send a second update request message to the RAN2 node. The second update request message includes information about the network slice that is changed, to instruct the RAN2 node to update stored information about the network slice supported by the RAN1.

Optionally, in 404, the RAN2 node may further send a second update request acknowledgment message to the RAN1 node. The second update request acknowledgment message is used to indicate that the RAN2 has received the second update request message. Optionally, if the RAN2 node fails to receive an update request message sent by the RAN1 node, the second update request acknowledgment message may carry a specific failure cause. For example, the failure cause may include a configuration failure of a configuration corresponding to a specific network slice, or a plurality of or all network slices.

Therefore, the RAN1 node and the RAN2 node may exchange, in a manner described in FIG. 4, statuses of network slices supported by the two RAN nodes. Likewise, any two access-network nodes in a communications system can exchange, in the manner described in FIG. 4, statuses of network slices supported by the two RAN nodes. In this way, a RAN node currently accessed by a terminal device may obtain, in the manner described in FIG. 4, a status of a network slice supported by a RAN node to be accessed by the terminal device, so as to select an appropriate network slice for the terminal device based on the status of the network slice supported by the RAN node to be accessed.

Embodiment 2: A second network node is a RAN2 node, a second network slice set is determined by a CN1 node and denoted as an NS Set2-CN1, and the CN1 node and a CN2 node are a same core-network node.

In this case, in 201, a RAN1 node sends a first message to the RAN2 node.

In 203, the RAN2 node sends a fourth message to the CN1 node.

In 204, the CN1 node sends a fourth response message to the RAN2 node.

In 202, the RAN1 node receives a first response message sent by the RAN2 node.

The first message includes a network slice identifier corresponding to at least one network slice in a first network slice set (namely, an NS Set1-RAN1). In 203, the RAN2 node sends the fourth message to the CN1, and the fourth message includes a network slice identifier corresponding to at least one network slice (for ease of distinguishing and description, denoted as an NS Set1-RAN1-RAN2) in the first network slice set. The NS Set1-RAN1-RAN2 in the fourth message may include some or all network slices in the NS Set1-RAN1. The fourth response message includes a network slice identifier corresponding to at least one network slice in the second network slice set (namely, an NS Set2-CN1).

Specifically, when the RAN2 cannot determine which network slices are to be accessed by the terminal device, the RAN2 may send the fourth message to a core-network node, namely, the CN1 node, in a communications system to which the RAN2 belongs, and notify, by using the fourth message, the CN1 node of the network slices that the terminal device wants to access. In this way, the CN1 node may re-determine, for the terminal device based on the network slice identifier corresponding to the at least one network slice in the first network slice set (namely, the NS Set1-RAN1-RAN2), to-be-accessed network slices, namely, the second network slice set. Based on the network slice identifier corresponding to the at least one network slice in the first network slice set (namely, the NS Set1-RAN1-RAN2) included in the fourth message, the CN1 may determine the second network slice set with reference to a factor such as a status of a network slice supported by the RAN2 and a load status. For example, the CN1 may determine that all network slices supported by the RAN2 in the NS Set1-RAN1-RAN2 form the second network slice set, or may determine that some network slices supported by the RAN2 in the NS Set1-RAN1-RAN2 form the second network slice set.

In other words, the NS Set2-CN1 may include some or all network slices in the NS Set1-RAN1-RAN2. In other words, the NS Set2-CN1 may be a subset of the NS Set1-RAN1-RAN2. A network slice that is determined by the CN1 node and that is used for access by the terminal device may include some or all network slices in network slices that are selected for the terminal device and that are used for access by the terminal device. The CN1 node may filter out some network slices based on the status of the network slice supported by the RAN2 node.

Optionally, the CN1 node may alternatively reselect some or all network slices for the terminal device. In other words, the NS Set2-CN1 may not be a subset of the NS Set1-RAN1-RAN2. The NS Set2-CN1 may also include a network slice that is not included in the NS Set1-RAN1-RAN2. The network slice that is included in the NS Set2-CN1 but not included in the NS Set1-RAN1-RAN2 may be a network slice that is reselected for the terminal device by the CN1. Alternatively, the CN1 may update information about some or all network slices in the NS Set1-RAN1-RAN2.

Optionally, the fourth message may further include a temporary identifier corresponding to the terminal device, and the temporary identifier is used to search for stored context information of the terminal device by the CN1 node.

Optionally, the fourth message may further include service information corresponding to the NS Set1-RAN1-RAN2. For specific content included in the service information corresponding to the NS Set1-RAN1-RAN2, refer to the service information corresponding to the NS Set1-RAN1 in the first message. For brevity, details are not described herein again.

Optionally, the fourth message may further include security information corresponding to the NS Set1-RAN1-RAN2. For specific content included in the security information corresponding to the NS Set1-RAN1-RAN2, refer to the security information corresponding to the NS Set1-RAN1 in the first message. For brevity, details are not described herein again.

Optionally, in addition to the network slice identifier that is corresponding to the at least one network slice in the second network slice set (namely, the NS Set2-CN1) and that is reselected for the terminal device by the CN1 node, the fourth response message may further include service information corresponding to the at least one network slice in the second network slice set (namely, the NS Set2-CN1), for example, protocol data unit (Protocol Data Unit, PDU) session information that is used to store, by the RAN2 node, session information, a session identifier, a bearer identifier, a QoS parameter, a tunnel identifier, a transport-layer Internet Protocol (Internet Protocol, IP) address, and the like that are modified by the CN1 for the terminal device.

Optionally, the fourth response message may further include a first non-access stratum (Non Access Stratum, NAS) message. The first NAS message is an encapsulation message in the fourth response message. The first NAS message is generated by the CN1 node, and the first NAS message includes the network slice identifier corresponding to the at least one network slice in the second network slice set (namely, the NS Set2-CN1). The first NAS message is used to instruct the terminal device to initiate a network slice reselection process. After receiving the fourth response message including the first NAS message, the RAN2 may transmit the first NAS message to the RAN1, so that the RAN1 may transmit the first NAS message to the terminal device. After receiving the first NAS message, the terminal device may initiate, based on the first NAS message, the network slice reselection process, which is alternatively referred to as a network slice update process. Optionally, the first NAS message may be further used to modify or deactivate PDU session information initiated by the terminal device.

In 202, the RAN2 node sends the first response message to the RAN1 node. The first response message includes the network slice identifier corresponding to the at least one network slice in the second network slice set (for ease of distinguishing and description, denoted as an NS Set2-CN1-RAN2). The NS Set2-CN1-RAN2 may include some or all network slices in the NS Set2-CN1. In other words, the RAN2 node can further filter out, based on a factor such as the status of the network slice supported by the RAN2 node or the load status, some network slices included in the first response message.

Optionally, in addition to the network slice identifier corresponding to the network slice in the NS Set2-CN1-RAN2, the first response message may further include at least one of the following:
  allowed-to-be-established service information and not-allowed-to-be-established service information that are corresponding to the at least one network slice in the second network slice set.

Specifically, each network slice is corresponding to corresponding service information, such as bearer information, session information, or stream information. The RAN2 may be allowed only to establish service information corresponding to some network slices in the NS Set2-CN1-RAN2, may be allowed only to establish some service information corresponding to some network nodes in the NS Set2-CN1-RAN2, or it is likely that service information corresponding to a network slice in the NS Set2-CN1-RAN2 is not allowed to be established. In this case, the first response message may include allowed-to-be-established service information and/or not-allowed-to-be-established service information that are/is corresponding to the at least one network slice in the NS Set2-CN1-RAN2.

Optionally, in Embodiment 2, the first message may be a handover request message, or may be another message used for communication between a RAN node and another RAN node. Correspondingly, the first response message may be a handover request acknowledgment message, or may be another message used for communication between the RAN node and the another RAN node.

Optionally, in Embodiment 2, the fourth message may be a handover request message, a path switch request message, or may be another message used for communication between a RAN node and a CN node. Correspondingly, the fourth response message may be a handover request acknowledgment message, a path switch request acknowledgment message, or may be another message used for communication between the RAN node and the CN node.

Embodiment 3: A second network node is a CN1 node, a second network slice set is determined by the CN1 node, the second network slice set is denoted as an NS Set2-CN1, and the CN1 and a CN2 are a same core-network node.

In this case, in 201, a RAN1 node sends a first message to the CN1 node.

In 202, the CN1 node replies to the RAN1 node with a first response message.

Specifically, in 201, the CN1 node may receive the first message sent by the RAN1 node, where the first message includes a network slice identifier corresponding to at least one network slice in a first network slice set (namely, an NS Set1-RAN1). Based on the NS Set1-RAN1, the CN1 node may determine the second network slice set with reference to a status of a network slice supported by a RAN2. For example, with reference to the status of the network slice supported by the RAN2, the CN1 node may determine that all network slices supported by the RAN2 in the NS Set1-RAN1 form the second network slice set, or may determine that some network slices supported by the RAN2 in the NS Set1-RAN1 form the second network slice set. Optionally, the CN1 node may obtain in advance, by using the method described in 303 in FIG. 3, the status of the network slice supported by the RAN2 node. Details are not described herein again.

In other words, if the second network node that receives the first message sent by the RAN1 node is the CN1 node, the CN1 node may directly determine, based on the network slice identifier corresponding to the at least one network slice in the first network slice set (namely, the NS Set1-RAN1) included in the first message and with reference to the status of the network slice supported by the RAN2 node, the network slice identifier corresponding to the at least one network slice in the second network slice set (namely, the NS Set2-CN1).

Optionally, the NS Set2-CN1 may include some or all network slices in the NS Set1-RAN1. In other words, the NS Set2-CN1 is a subset of the NS Set1-RAN1. A network slice that is determined by the CN1 node and that is used for access by a terminal device may include some or all network slices in network slices that are selected for the terminal device and that are used for access by the terminal device. The CN1 node may filter out some network slices based on the status of the network slice supported by the RAN2 node.

Optionally, the CN1 node may alternatively reselect some or all network slices for the terminal device. In other words, the NS Set2-CN1 may not be a subset of the NS Set1-RAN1. The NS Set2-CN1 may also include a network slice that is not included in the NS Set1-RAN1. The network slice that is included in the NS Set2-CN1 but not included in the NS Set1-RAN1 may be a network slice that is reselected for the terminal device by the CN1. Alternatively, the CN1 may update information about some or all network slices in the NS Set1-RAN1.

Optionally, in addition to a network slice identifier corresponding to each network slice in the NS Set2-CN1, the first response message may further include at least one of the following:

allowed-to-be-established service information and not-allowed-to-be-established service information that are corresponding to the at least one network slice in the second network slice set.

Specifically, each network slice is corresponding to corresponding service information, such as bearer information, session information, or stream information. The first response message may include allowed-to-be-established service information and/or not-allowed-to-be-established service information that are/is corresponding to the at least one network slice in the NS Set2-CN1.

Optionally, the first response message may further include a first NAS message. The first NAS message is an encapsulation message in the first response message. The first NAS message is generated by the CN1, and the first NAS message includes the network slice identifier corresponding to the at least one network slice in the second network slice set (namely, the NS Set2-CN1). The first NAS message is used to instruct the terminal device to initiate a network slice reselection process. After receiving the first response message including the first NAS message, the RAN1 node may transmit the first NAS message to the terminal device. After receiving the first NAS message, the terminal device may initiate, based on the first NAS message, the network slice reselection process, which is alternatively referred to as a network slice update process. Optionally, the first NAS message may be further used to modify or deactivate PDU session information initiated by the terminal device.

Optionally, in Embodiment 3, the first message may be a handover request message, or may be another message used for communication between a RAN node and a CN node. Correspondingly, the first response message may be a handover request acknowledgment message, or may be another message used for communication between the RAN node and the CN node.

Optionally, in Embodiment 3, the method 200 may further include the following steps.

In 211, the CN1 node sends a first notification message to the RAN2 node.

In 212, the RAN2 node sends a first notification acknowledgment message to the CN1 node.

The first notification message includes the network slice identifier corresponding to the at least one network slice in the second network slice set (namely, the NS Set2-CN1), and the first notification acknowledgment message is used to notify the CN1 node that the RAN2 node has received the first notification message sent by the CN1 node.

Optionally, the first notification message may be a handover request message, or may be another message used for communication between the RAN node and the CN node. Correspondingly, the first notification acknowledgment message may be a handover request acknowledgment message, or may be another message used for communication between the RAN node and the CN node.

Embodiment 4: A second network node is a CN1 node, a second network slice set is determined by a CN2 node and denoted as an NS Set2-CN2, and the CN1 and the CN2 are different core-network nodes.

In this case, in 201, a RAN1 node sends a first message to the CN1 node.

In 208, the CN1 node sends a seventh message to the CN2 node.

In 209, the CN2 node sends a seventh response message to the CN1 node.

In 202, the RAN1 node receives a first response message sent by the CN1 node.

Specifically, if the RAN1 node and the RAN2 node do not belong to a same communications system, for example, if the RAN1 node belongs to a 4G communications system and the RAN2 node belongs to a 5G communications system, or if the RAN1 node belongs to a 5G communications system and the RAN2 node belongs to a 4G communications system, the CN1 node and the CN2 node are not a same core-network node. After receiving the first message sent by the RAN1 node, the CN1 node may request the CN2 node to determine a network slice to be accessed by a terminal device. For a manner of determining, by the CN2 node, a network slice to be accessed by the terminal device, refer to the manner of determining, by the CN1 node, a network slice to be accessed by the terminal device in Embodiment 3 or Embodiment 2. Details are not described herein again.

Specifically, because a DCN identifier is an identifier used to identify an LTE system or an eLTE system, if the communications systems to which the CN1 node and the CN2 node belong include an LTE system or an eLTE system, a function of mapping a network slice identifier to a DCN identifier at the CN1 node or the CN2 node needs to be implemented. If the communications system to which the CN2 node belongs is an LTE system or an eLTE system, and the communications system to which the CN1 node belongs is a 5G system, and if the first message includes a network slice identifier corresponding to at least one network slice in an NS Set1-RAN1, the CN1 node needs to map the network slice identifier to a DCN identifier. Specifically, the CN1 node maps the network slice identifier corresponding to the at least one network slice in the NS Set1-RAN1 to a DCN identifier corresponding to the at least one network slice in the NS Set1-RAN1, selects the CN2 node that is corresponding to the RAN2, and sends the seventh message to the CN2 node in 208. The seventh message includes the DCN identifier corresponding to the at least one network slice in the NS Set1-RAN1. Subsequently, the CN2 node determines a second network slice set, namely, an NS Set2-CN2. In this case, the CN2 needs to map a DCN identifier to a network slice identifier. Specifically, the CN2 maps a DCN identifier corresponding to at least one network slice in the second network slice set to a network slice identifier corresponding to the at least one network slice in the second network slice set. Then in 209, the CN2 node sends a seventh response message to the CN1 node. The seventh response message includes the network slice identifier corresponding to the at least one network slice in the second network slice set.

Optionally, if the communications system to which the CN2 node belongs is a 5G system, and the communications system to which the CN1 node belongs is an LTE system or an eLTE system, and if the first message includes a DCN identifier corresponding to the at least one network slice in the NS Set1-RAN1, the CN1 node needs to map the DCN identifier to a network slice identifier. Specifically, the CN1 node maps the DCN identifier corresponding to the at least one network slice in the NS Set1-RAN1 to the network slice identifier corresponding to the at least one network slice in the NS Set1-RAN1, selects the CN2 node that is corresponding to the RAN2, and sends the seventh message to the CN2 in 208. The seventh message includes the network slice identifier corresponding to at least one DCN identifier in the NS Set1-RAN1. Subsequently, the CN2 node determines the second network slice set, namely, the NS Set2-CN2. In this case, the CN2 needs to map a network slice identifier to a DCN identifier. Specifically, the CN2 maps the network slice identifier corresponding to the at least one network slice in the second network slice set to a DCN identifier corresponding to the at least one network slice in the second network slice set. Then in 209, the CN2 node sends a seventh response message to the CN1 node. The seventh response message includes the DCN identifier corresponding to the at least one network slice in the second network slice set.

Then in 202, the CN1 node sends the first response message to the RAN1 node. For specific content included in the first response message, refer to Embodiment 1 to Embodiment 3. For brevity, details are not described herein again.

Optionally, the method in Embodiment 4 may further include the following steps.

213: The CN2 sends a second notification message to the RAN2 node.

214: The RAN2 sends a second notification acknowledgment message to the CN2.

The second notification message is used to notify the RAN2 node that the CN2 node has reselected a to-be-accessed network slice for the terminal device, and the second notification acknowledgment message is used to indicate that the RAN2 node has received the second notification message.

Optionally, in Embodiment 4, the first message may be a handover request message, or may be another message used for communication between a RAN node and a CN node. Correspondingly, the first response message may be a handover request acknowledgment message, or may be another message used for communication between the RAN node and the CN node.

Optionally, in Embodiment 4, the seventh message may be a handover request message, or may be another message used for communication between a CN node and a CN node. Correspondingly, the seventh response message may be a handover request acknowledgment message, or may be another message used for communication between the CN node and the CN node.

In conclusion, with reference to the foregoing four embodiments, if the second network node that receives the first message is the RAN2 node, after receiving the first message sent by the RAN1 node, the RAN2 node may directly determine, based on the network slice identifier corresponding to the at least one network slice in the first network slice set (namely, the NS Set1-RAN1) included in the first message, the network slice identifier corresponding to the at least one network slice in the second network slice set (namely, the NS Set2-RAN2) (Embodiment 1). Alternatively, the RAN2 can request the core-network node CN1 (in this case, the RAN1 and the RAN2 belong to the same communications system, and the CN1 is the CN2) in the communications system to which the RAN2 belongs to determine the network slice identifier corresponding to the at least one network slice in the second network slice set (namely, the NS Set2-CN1) (Embodiment 2).

Alternatively, if the second network node that receives the first message sent by the RAN1 node is the CN1 node, the CN1 may directly determine, based on the network slice identifier corresponding to the at least one network slice in the first network slice set (namely, the NS Set1-RAN1) included in the first message, the network slice identifier corresponding to the at least one network slice in the second network slice set (namely, the NS Set2-CN1) (Embodiment 3). Alternatively, the CN1 node may request the core-network node CN2 (in this case, the RAN1 and the RAN2 do not belong to the same communications system, and the CN1 and the CN2 are different core-network nodes) in the communications system to which the RAN2 belongs to determine the network slice identifier corresponding to the at least one network slice in the second network slice set (namely, the NS Set2-CN2) (Embodiment 4).

It should be understood that processes described in Embodiment 1 to Embodiment 4 may be performed during a cell handover process. For example, the first message may be a handover request message, the first response message is a handover request acknowledgment message, the fourth message is a handover request message or a path switch request message, and the fourth response message is a handover request acknowledgment message or a path switch request acknowledgment message. The processes may alternatively be performed before cell handover. This is not limited in the embodiments of this application.

Optionally, after 202, as shown in FIG. 2, the method 200 may further include the following step.

In 205, the RAN1 node sends a second message to the terminal device.

For Embodiment 1, the second message may include at least one of the following:

1. A target cell identity: used to identify the target cell;
2. A new temporary identifier of the terminal device: used to identify the terminal device in the target cell; and 3. A bearer configuration message: for example, Packet Data Convergence Protocol (Packet Data Convergence Protocol, PDCP), radio link control (Radio Link Control, RLC), Medium Access Control (Medium Access Control, MAC), or physical layer configuration information.

Optionally, for Embodiment 2, Embodiment 3, and Embodiment 4, in addition to at least one piece of the information included in Embodiment 1, the second message may further include the first NAS message. The first NAS message includes a network node that is determined by a core-network node and that is used for access by the terminal device. For example, for Embodiment 2 and Embodiment 3, the first NAS message includes the network slice identifier corresponding to the at least one network slice in the NS Set2-CN1; and for Embodiment 4, the first NAS message includes the network slice identifier corresponding to the at least one network slice in the NS Set2-CN2. The first NAS message is used to instruct the terminal device to initiate a network slice reselection process. After receiving the first NAS message, the terminal device may initiate, based on the first NAS message, the network slice reselection process, which is alternatively referred to as a network slice update process. Optionally, the first NAS message may be further used to modify or deactivate PDU session information initiated by the terminal device.

Optionally, the second message may be a handover instruction or another RRC message.

Optionally, if the second message includes the first NAS message, the method 200 may further include the following step.

In 206, the terminal device sends a fifth message to the RAN2 node.

The fifth message includes a second NAS message. The second NAS message is generated by the terminal device based on the first NAS message, and the second NAS message includes the network slice identifier corresponding to the at least one network slice in the second network slice set. For example, for Embodiment 2 and Embodiment 3, the second NAS message includes the network slice identifier corresponding to the at least one network slice in the NS Set2-CN1; and for Embodiment 4, the second NAS message includes the network slice identifier corresponding to the at least one network slice in the NS Set2-CN2.

After the RAN2 node receives the second NAS message, in 207, the RAN2 node sends a sixth message to a corresponding core-network node. The sixth message includes the second NAS message. In other words, the second NAS message may be transmitted to the corresponding core-network node by using the sixth message. For example, for Embodiment 2 and Embodiment 3, the RAN2 node may transmit the second NAS message to the CN1 node in 207, and for Embodiment 4, the RAN2 node may transmit the second NAS message to the CN2 node in 207.

Figure 5:
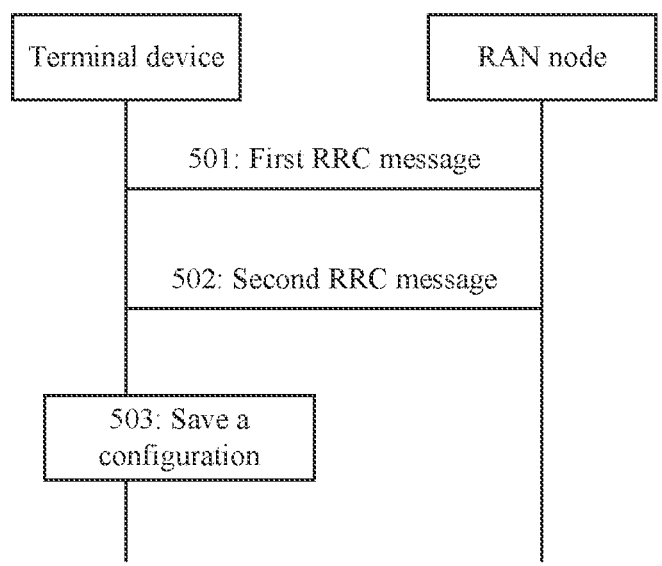
FIG. 5 is a schematic interaction diagram of a communication method according to still another embodiment of this application.

FIG. 5 is a schematic interaction diagram of a communication method 500 according to still another embodiment of this application. As shown in FIG. 5, the method 500 includes the following steps.

In 501, a terminal device sends a first RRC message to a RAN node.

In 502, the RAN node sends a second RRC message to the terminal device.

In 503, the terminal device saves configuration information.

The first RRC message may be an RRC connection request, an RRC connection re-establishment request, an RRC connection setup complete message, or another message used for communication between the terminal device and the RAN node. Correspondingly, the second RRC message may be an RRC connection reject (RRC Connection Reject) message, an RRC connection release (RRC Connection Release) message, a MAC control element (Control Element, CE), or another message used for communication between the terminal device and the RAN node.

Specifically, the first RRC message may include a network slice identifier corresponding to at least one network slice in a first network slice set, and is used to indicate a network slice that needs to be accessed by the terminal device.

Optionally, the first RRC message may further carry a NAS message that is used to initiate a network slice selection or PDU session establishment process.

Optionally, if the first RRC message includes network slice identifiers corresponding to a plurality of network slices, the terminal device may further indicate a priority of one or more network slices in the plurality of network slices.

Optionally, the first RRC message may further include a network slice reselection policy. For example, the network slice reselection policy may indicate whether a network device is allowed to always select one or more network slices for the terminal device, or whether the network device is allowed to select another network slice for the terminal device in a manner of handover or cell reselection. For example, for a network slice indicated by at least one network slice identifier, an identifier of at least one network slice that can replace the network slice may be included. Optionally, the identifier of the at least one network slice that can replace the network slice may be sorted based on a priority. A criterion for determining a priority is not limited in this embodiment of this application. For example, the sorting may be performed based on a network slice priority.

Optionally, the second RRC message may further include a network slice identifier corresponding to a network slice that is in a first network slice set and for which connection establishment is rejected, or may include a rejection cause corresponding to the network slice for which connection establishment is rejected. For example, the rejection cause may be that the network slice to which the terminal device wants to establish a connection is unavailable or does not exist in a RAN or a CN.

Optionally, the second RRC message may further include redirection cell information. The redirection cell information is used to indicate information about a cell that is selected by the RAN node for the terminal device and that is to be reaccessed by the terminal device, for example, a cell identity, a physical-layer cell identity, or a carrier frequency. When the terminal device exits an RRC connection state and re-initiates cell selection, the terminal device may be redirected to a cell indicated by the redirection cell information.

Optionally, the second RRC message may further include information such as an allowed-to-be-accessed or prohibited-from-being-accessed cell identity, a tracking area identifier or code, a paging area identifier, or a PLMN identifier of at least one network slice in the first network slice set.

Optionally, the second RRC message may further include a listen before talk (Listen Before Talk, LBT) parameter corresponding to the at least one network slice in the first network slice set. If the terminal device is redirected to a cell of an unlicensed spectrum, the second RRC message may further include at least one piece of information such as a mapping relationship between a service and the LBT parameter, preempted-channel priority indication information, a delayed access time, and a contention window size.

Optionally, the second RRC message may further include a random access configuration parameter corresponding to the at least one network slice in the first network slice set, for example, available random access preamble information, and time-frequency resource location information of a physical random access channel (Physical Random Access Channel, PRACH) resource.

Optionally, the second RRC message may further include redirection carrier information. The redirection carrier information is used to indicate a carrier frequency to which the terminal device needs to be redirected when the terminal device exits an RRC connection state and re-initiates cell selection, for example, a carrier frequency applicable to a 5G, eLTE, LTE, or a like communications system.

Optionally, the second RRC message may further include a frequency priority list, and the frequency priority list includes a priority applicable to cell reselection corresponding to a frequency of each access technology.

In 503, the terminal device may save at least one piece of the foregoing information included in the second RRC message, and the at least one piece of the foregoing information is used for mobility management of the terminal device in an RRC idle state, for example, cell selection or cell reselection.

Figure 6:
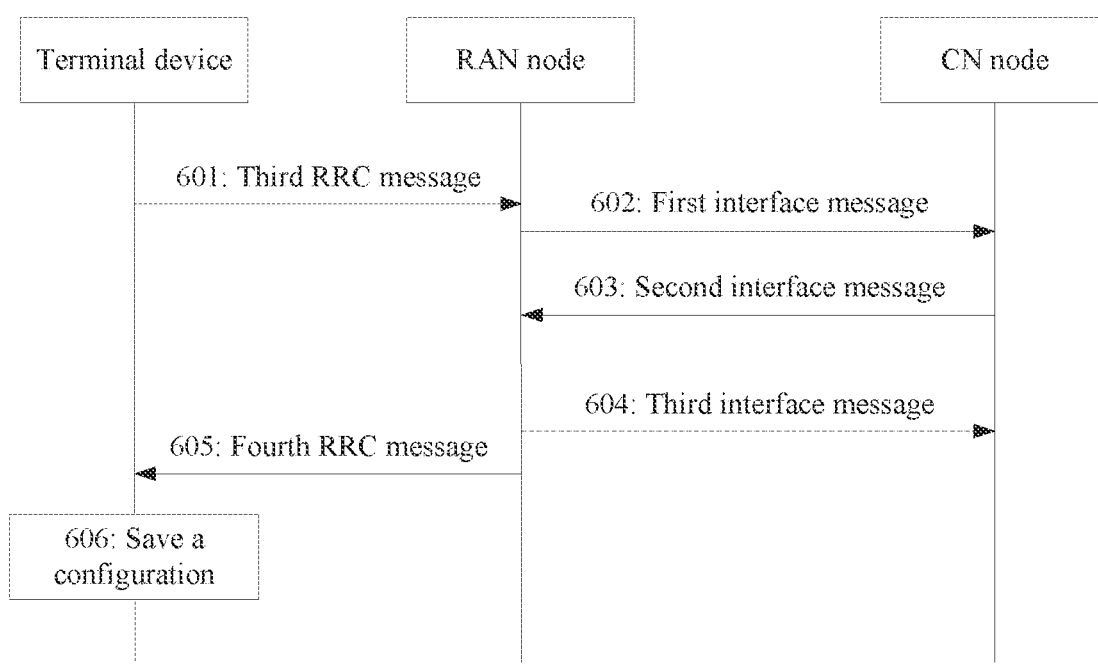
FIG. 6 is a schematic interaction diagram of a communication method according to still another embodiment of this application.

FIG. 6 is a schematic interaction diagram of a communication method 600 according to still another embodiment of this application. As shown in FIG. 6, the method 600 includes the following steps.

In 601, a terminal device sends a third RRC message to a RAN node, where the third RRC message includes a network slice identifier corresponding to at least one network slice in a first network slice set.

Optionally, the third RRC message may further carry a NAS message that is used to initiate a network slice selection or PDU session establishment process.

Optionally, if the third RRC message includes network slice identifiers corresponding to a plurality of network slices, the terminal device may further indicate a priority of one or more network slices.

Optionally, the third RRC message may further include a network slice reselection policy. The network slice reselection policy may indicate whether a network device is allowed to always select one or more network slices for the terminal device, or whether the network device is allowed to select another network slice for the terminal device in a manner of handover or cell reselection. For example, for a network slice indicated by at least one network slice identifier, an identifier of at least one network slice that can replace the network slice may be included. Optionally, the identifier of the at least one network slice that can replace the network slice may be sorted based on a priority. A criterion for determining a priority is not limited in this embodiment of this application. For example, the sorting may be performed based on a network slice priority.

In 602, the RAN node transmits, to a CN node by using a first interface message, the NAS message carried in 601.

The first interface message is an interface message used for communication between the RAN node and the CN node.

In 603, the CN node sends a second interface message to the RAN node. The second interface message includes a network slice identifier corresponding to a network slice selected by the CN node for the terminal device, namely, a network slice identifier corresponding to at least one network slice in a second network slice set. The second interface message is a message used for communication between the RAN node and the CN node.

Optionally, the second interface message may further include the network slice identifier corresponding to the at least one network slice in the first network slice set.

Optionally, the second interface message may further include information such as an allowed-to-be-accessed or prohibited-from-being-accessed cell identity, a tracking area identifier or code, a paging area identifier, and a PLMN identifier of the at least one network slice in the second network slice set.

Optionally, the second interface message may be transmitted transparently by the RAN node to the terminal device in a form of a NAS message, and the NAS message may include some or all content of the second interface message.

For information content included in the second interface message, refer to the content included in the first response message in Embodiment 3. Details are not described herein again.

Optionally, if the RAN node does not support some or all network slices in the second network slice set, in 604, the RAN node may send a third interface message to the CN node. The third interface message is used to notify the CN node that the RAN node does not support some or all network slices in the second network slice set that is determined by the CN node. Optionally, the third interface message may include a network slice identifier corresponding to a network slice that cannot be supported by the RAN2 node.

In 605, the RAN node sends a fourth RRC message to the terminal device. For information content included in the fourth RRC message, refer to the information content included in the second interface message. For brevity, details are not described herein again.

In 606, the terminal device may save at least one piece of the foregoing information included in the fourth RRC message, and the at least one piece of the foregoing information is used for mobility management of the terminal device in an RRC idle state, for example, cell selection or cell reselection.

The foregoing describes in detail the method embodiments of this application with reference to FIG. 2 to FIG. 6. The following describes in detail apparatus embodiments of this application with reference to FIG. 7 to FIG. 8. It should be understood that the apparatus embodiments and the method embodiments are mutually corresponding. For similar descriptions, refer to the method embodiments.

Figure 7:
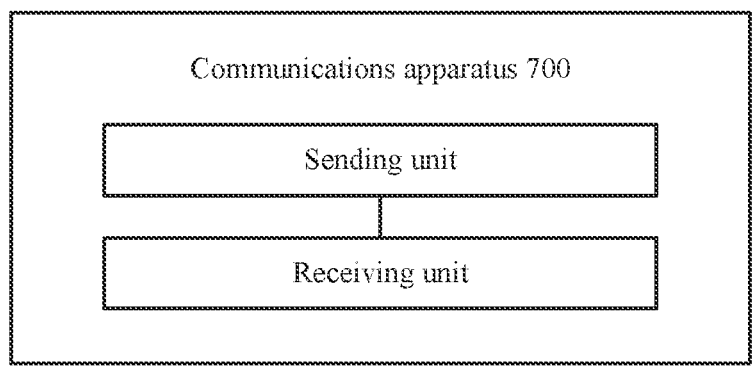
FIG. 7 is a schematic block diagram of a communications apparatus according to an embodiment of this application.

FIG. 7 is a schematic block diagram of a communications apparatus 700 according to an embodiment of this application. The communications apparatus 700 may be corresponding to (for example, may be disposed on or is) the first network node, which is alternatively referred to as the first access-network node (namely, the RAN1 node), described in the method 200, or the RAN1 node described in the method 300, or the RAN1 node described in the method 400, or the RAN node described in the method 500, or the RAN node described in the method 600. In addition, modules or units of the communications apparatus 700 are respectively configured to execute actions or processing processes executed by the first network node, which is alternatively referred to as the first access-network node (namely, the RAN1 node), described in the method 200, or by the RAN1 node described in the method 300, or by the RAN1 node or the RAN2 node described in the method 400, or by the RAN node described in the method 500, or by the RAN node described in the method 600. Herein, to avoid repetition, detailed description thereof is omitted.

In this embodiment of this application, the communications apparatus 700 may include a processor and a transceiver, and the processor and the transceiver are communicatively connected. Optionally, the communications apparatus 70) further includes a memory, and the memory and the processor are communicatively connected. Optionally, the processor, the memory, and the transceiver may be communicatively connected. The memory may be configured to store an instruction, and the processor is configured to execute the instruction stored in the memory, so as to control the transceiver to send information or a signal.

A sending unit and a receiving unit of the communications apparatus 700 shown in FIG. 7 may be corresponding to the transceiver.

Figure 8:
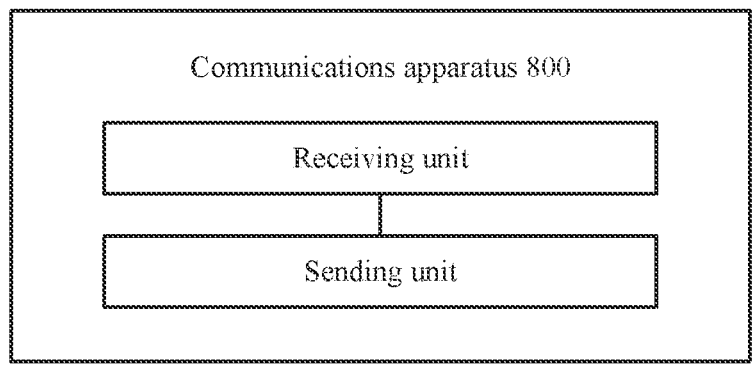
FIG. 8 is a schematic block diagram of a communications apparatus according to an embodiment of this application.

FIG. 8 is a schematic block diagram of a communications apparatus 800 according to an embodiment of this application. The communications apparatus 800 may be corresponding to (for example, may be disposed on or is) the second network node described in the method 200, such as the second access-network node (namely, the RAN2 node) or the first core-network node (namely, the CN1 node), or the CN1 node described in the method 300, or the RAN2 node described in the method 400, or the CN node described in the method 600. In addition, modules or units of the communications apparatus 800 are respectively configured to execute actions or processing processes executed by the second network node described in the method 200, such as the second access-network node (namely, the RAN2 node) or the first core-network node (namely, the CN1 node), or by the CN1 node described in the method 300, or by the RAN2 node described in the method 400, or by the CN node described in the method 600. Herein, to avoid repetition, detailed description thereof is omitted.

In this embodiment of this application, the communications apparatus 800 may include a processor and a transceiver, and the processor and the transceiver are communicatively connected. Optionally, the communications apparatus 800 further includes a memory, and the memory and the processor are communicatively connected. Optionally, the processor, the memory, and the transceiver may be communicatively connected. The memory may be configured to store an instruction, and the processor is configured to execute the instruction stored in the memory, so as to control the transceiver to send information or a signal.

A receiving unit and a sending unit of the communications apparatus 800 shown in FIG. 8 may be corresponding to the transceiver.

It should be noted that the foregoing method embodiments may be applied to the processor or be implemented by the processor. The processor may be an integrated circuit chip and has a signal processing capability. In an implementation process, steps in the foregoing method embodiments can be implemented by using a hardware integrated logical circuit in the processor, or by using an instruction in a form of software. The processor may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component. The processor can implement or execute the methods, steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and implements, with reference to hardware of the processor, the steps in the foregoing methods.

It may be understood that the memory in the embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. By way of illustrative rather than limitative description, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct Rambus random access memory (Direct Rambus RAM, DR RAM). It should be noted that the memory of the systems and methods described in this specification includes but is not limited to these memories and any memory of another proper type.

It should be understood that the term "and/or" in this specification describes only an association relationship for describing associated objects and represents that three relationships may exist. For example, A and/or B may represent the following three cases. Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the embodiments of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division, or may be other division in actual implementation. For example, a plurality of units or components may be combined or integrated into another system, or some features may be ignored, or may not be performed. In addition, the displayed or discussed mutual couplings or direct couplings or communication connections may be implemented by using some interfaces. The indirect couplings or communication connections between the apparatuses or units may be implemented in electrical, mechanical, or other forms. The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the embodiments of this application, but are not intended to limit the protection scope of the embodiments of this application. Any variation or replacement readily figured out by a person skilled in the art within the technical scope disclosed in the embodiments of this application shall fall within the protection scope of the embodiments of this application.

What is claimed is:

1. A communication method, comprising:
    sending, by a first network node currently accessed by a terminal device to a second network node to be accessed by the terminal device, a first message comprising a first network slice identifier, wherein the first network slice identifier corresponds to at least one network slice in a first network slice set and for access by the terminal device, wherein the first network slice identifier is represented by slice group information that indicates a network slice group; and
    receiving, by the first network node from the second network node, a first response message comprising a second network slice identifier and at least one of allowed-to-be established service information or not-allowed-to-be-established service information corresponding to at least one network slice in a second network slice set for access by the terminal device, and wherein the second network slice set is determined by the second network node based on a status of a network slice supported by the second network node and the first network slice identifier corresponding to the at least one network slice in the first network slice set.

2. The communication method according to claim 1, wherein the method further comprises:
    sending, by the first network node, a second message to the terminal device, wherein the second message comprises a first non-access stratum (NAS) message.

3. The communication method according to claim 1, wherein the method further comprises:
    sending, by the first network node, a first request message to the second network node, wherein the first request message requests to obtain information about a network slice supported by the second network node; and
    receiving, by the first network node, a first request response message from the second network node, wherein the first request response message comprises the information about the network slice supported by the second network node.

4. The communication method according to claim 3, wherein the first request message comprises information about a network slice supported by the first network node.

5. The communication method according to claim 1, wherein the first message further comprises at least one of the following:
    (1) a network slice priority, a network slice identifier, a cell identity, a tracking area identifier or code, a paging area identifier, and a public land mobile network (PLMN) identifier that are corresponding to a network slice prohibited from being accessed by the terminal device;
    (2) a network slice identifier, a cell identity, a tracking area identifier or code, a paging area identifier, and a PLMN identifier that are corresponding to a network slice allowed to be accessed by the terminal device;
    (3) security information, session information, and stream information that are corresponding to the at least one network slice in the first network slice set; or
    (4) a network slice reselection policy, wherein the network slice reselection policy indicates a manner of selecting a network slice for the terminal device by a network node.

6. A communication method, comprising:
    receiving, by a second network node to be accessed by a terminal device, a first message from a first network node currently accessed by the terminal device, wherein the first message comprises a first network slice identifier corresponding to at least one network slice in a first network slice set, and wherein the at least one network slice is selected for access by the terminal device, wherein the first network slice identifier is represented by slice group information that indicates a network slice group; and
    sending, by the second network node, a first response message to the first network node, wherein the first response message comprises a second network slice identifier and at least one of allowed-to-be established service information or not-allowed-to-be-established service information corresponding to at least one network slice in a second network slice set for access by the terminal device, and wherein the second network slice set is determined by the second network node based on a status of a network slice supported by the second network node and the first network slice identifier corresponding to the at least one network slice in the first network slice set.

7. The communication method according to claim 6, wherein the method further comprises:
receiving, by the second network node a first request message from the first network node, wherein the first request message requests to obtain information about a network slice supported by the second network node; and,
sending, by the second network node a first request response message to the first network node, wherein the first request response message comprises the information about the network slice supported by the second network node.

8. The communication method according to claim 7, wherein the first request message comprises information about a network slice supported by the first network node.

9. The communication method according to claim 6, wherein the first message further comprises at least one of the following:
(1) a network slice priority, a network slice identifier, a cell identity, a tracking area identifier or code, a paging area identifier, and a public land mobile network (PLMN) identifier that are corresponding to a network slice prohibited from being accessed by the terminal device;
(2) a network slice identifier, a cell identity, a tracking area identifier or code, a paging area identifier, and a PLMN identifier that are corresponding to a network slice allowed to be accessed by the terminal device;
(3) security information, session information, and stream information that are corresponding to the at least one network slice in the first network slice set; or
(4) a network slice reselection policy, wherein the network slice reselection policy indicates a manner of selecting a network slice for the terminal device by a network node.

10. An apparatus applied for a first network node, comprising:
at least one processor, and a memory storing instructions for execution by the at least one processor to perform operations comprising:
sending, by the first network node currently accessed by a terminal device to a second network node to be accessed by the terminal device, a first message comprising a first network slice identifier, wherein the first network slice identifier corresponds to at least one network slice in a first network slice set and for access by the terminal device, wherein the first network slice identifier is represented by slice group information that indicates a network slice group; and
receiving, by the first network node from the second network node, a first response message comprising a second network slice identifier and at least one of allowed-to-be established service information or not-allowed-to-be-established service information corresponding to at least one network slice in a second network slice set for access by the terminal device, and wherein the second network slice set is determined by the second network node based on a status of a network slice supported by the second network node and the first network slice identifier corresponding to the at least one network slice in the first network slice set.

11. The apparatus according to claim 10, wherein the operations further comprises:
sending, a second message to the terminal device, wherein the second message comprises a first non-access stratum (NAS) message.

12. The apparatus according to claim 10, wherein the operations further comprises:
sending, a first request message to the second network node, wherein the first request message requests to obtain information about a network slice supported by the second network node; and
receiving, a first request response message from the second network node, wherein the first request response message comprises the information about the network slice supported by the second network node.

13. The apparatus according to claim 12, wherein the first request message comprises information about a network slice supported by the first network node.

14. The apparatus according to claim 10, wherein the first message further comprises at least one of the following:
(1) a network slice priority, a network slice identifier, a cell identity, a tracking area identifier or code, a paging area identifier, and a public land mobile network (PLMN) identifier that are corresponding to a network slice prohibited from being accessed by the terminal device;
(2) a network slice identifier, a cell identity, a tracking area identifier or code, a paging area identifier, and a PLMN identifier that are corresponding to a network slice allowed to be accessed by the terminal device;
(3) security information, session information, and stream information that are corresponding to the at least one network slice in the first network slice set; or
(4) a network slice reselection policy, wherein the network slice reselection policy indicates a manner of selecting a network slice for the terminal device by a network node.

15. An apparatus applied for a second network node, comprising:
at least one processor, and a memory storing instructions for execution by the at least one processor to perform operations comprising:
receiving, by the second network node to be accessed by a terminal device, a first message from a first network node currently accessed by the terminal device, wherein the first message comprises a first network slice identifier corresponding to at least one network slice in a first network slice set, and wherein the at least one network slice is selected for access by the terminal device, wherein the first network slice identifier is represented by slice group information that indicates a network slice group; and
sending, by the second network node, a first response message to the first network node, wherein the a first response message comprises a second network slice identifier and at least one of allowed-to-be established service information or not-allowed-to-be-established service information corresponding to at least one network slice in a second network slice set for access by the terminal device, and wherein the second network slice set is determined by the second network node based on a status of a network slice supported by the second network node and the first network slice identifier corresponding to the at least one network slice in the first network slice set.

16. The apparatus according to claim 15, wherein the operations further comprises:

receiving, a first request message from the first network node, wherein the first request message requests to obtain information about a network slice supported by the second network node; and, sending, a first request response message to the first network node, wherein the first request response message comprises the information about the network slice supported by the second network node.

17. The apparatus according to claim 16, wherein the first request message comprises information about a network slice supported by the first network node.

18. The apparatus according to claim 15, wherein the first message further comprises at least one of the following:
(1) a network slice priority, a network slice identifier, a cell identity, a tracking area identifier or code, a paging area identifier, and a public land mobile network (PLMN) identifier that are corresponding to a network slice prohibited from being accessed by the terminal device;
(2) a network slice identifier, a cell identity, a tracking area identifier or code, a paging area identifier, and a PLMN identifier that are corresponding to a network slice allowed to be accessed by the terminal device;
(3) security information, session information, and stream information that are corresponding to the at least one network slice in the first network slice set; or
(4) a network slice reselection policy, wherein the network slice reselection policy indicates a manner of selecting a network slice for the terminal device by a network node.

19. The communication method according to claim 1, wherein the first network slice identifier is further represented by using at least one of the following parameters:
(1) network slice type information, wherein the network slice type information indicates a network slice type;
(2) service type information, wherein the slice type information indicates a service characteristic of a video service, an Internet-of-Vehicles service, a voice service, and the like, or information about a specific service;
(3) Tenant information, wherein the tenant information indicates information about a client who creates or leases a network slice;
(4) User group information, wherein the user group information indicates group information of grouping a user based on a characteristic;
(5) Network slice instance information, wherein the network slice instance information indicates an instance identifier and characteristic information that are created for the network slice; or
(6) Dedicated core network identifier, wherein the dedicated core network identifier is used to uniquely indicate a dedicated core network in the LTE system or the eLTE system.

20. The communication method according to claim 6, wherein the first network slice identifier is further represented by using at least one of the following parameters:
(1) network slice type information, wherein the network slice type information indicates a network slice type;
(2) service type information, wherein the slice type information indicates a service characteristic of a video service, an Internet-of-Vehicles service, a voice service, and the like, or information about a specific service;
(3) Tenant information, wherein the tenant information indicates information about a client who creates or leases a network slice;
(4) User group information, wherein the user group information indicates group information of grouping a user based on a characteristic;
(5) Network slice instance information, wherein the network slice instance information indicates an instance identifier and characteristic information that are created for the network slice; or
(6) Dedicated core network identifier, wherein the dedicated core network identifier is used to uniquely indicate a dedicated core network in the LTE system or the eLTE system.

* * * * *

UNITED STATES PATENT AND TRADEMARK OFFICE
CERTIFICATE OF CORRECTION

| | | |
|---|---|---|
| PATENT NO. | : 11,997,499 B2 | Page 1 of 1 |
| APPLICATION NO. | : 17/358580 | |
| DATED | : May 28, 2024 | |
| INVENTOR(S) | : Chong Lou et al. | |

It is certified that error appears in the above-identified patent and that said Letters Patent is hereby corrected as shown below:

In the Claims

In Column 44, In Line 54, In Claim 15, delete "the a" and insert -- the --.

Signed and Sealed this
Twelfth Day of November, 2024

Katherine Kelly Vidal
*Director of the United States Patent and Trademark Office*